(12) United States Patent
Yano et al.

(10) Patent No.: US 7,553,604 B2
(45) Date of Patent: *Jun. 30, 2009

(54) CYANINE COMPOUND, OPTICAL RECORDING MATERIAL, AND OPTICAL RECORDING MEDIUM

(75) Inventors: Toru Yano, Tokyo (JP); Koichi Shigeno, Tokyo (JP); Mitsuhiro Okada, Tokyo (JP)

(73) Assignee: Adeka Corporation, Tokyo (JP)

( * ) Notice: Subject to any disclaimer, the term of this patent is extended or adjusted under 35 U.S.C. 154(b) by 491 days.

This patent is subject to a terminal disclaimer.

(21) Appl. No.: 10/899,027

(22) Filed: Jul. 27, 2004

(65) Prior Publication Data

US 2005/0031993 A1 Feb. 10, 2005

(30) Foreign Application Priority Data

Aug. 7, 2003 (JP) ............................. 2003-289165

(51) Int. Cl.
*G11B 7/24* (2006.01)
(52) U.S. Cl. ............... 430/270.21; 430/945; 430/270.2; 430/270.18; 428/64.8; 369/283; 369/288
(58) Field of Classification Search ........................ None
See application file for complete search history.

(56) References Cited

U.S. PATENT DOCUMENTS

| 4,399,207 | A | * | 8/1983 | Sakai et al. | ............... | 430/58.15 |
| 5,900,348 | A | | 5/1999 | Hu et al. | | |
| 5,958,087 | A | * | 9/1999 | Liao et al. | ............... | 8/644 |
| 6,291,045 | B1 | | 9/2001 | Tajima et al. | | |
| 7,425,401 | B2 | * | 9/2008 | Yano et al. | ............... | 430/270.21 |
| 2003/0068577 | A1 | * | 4/2003 | Liao et al. | ............... | 430/270.19 |
| 2006/0286483 | A1 | * | 12/2006 | Yano et al. | ............... | 430/270.21 |
| 2007/0259294 | A1 | * | 11/2007 | Shigeno et al. | ............... | 430/495.1 |
| 2008/0033179 | A1 | * | 2/2008 | Yano et al. | ............... | 546/277.4 |

FOREIGN PATENT DOCUMENTS

JP 58-021746 * 2/1983

(Continued)

OTHER PUBLICATIONS

Machine translation of JP 2003-231359.*

(Continued)

*Primary Examiner*—Martin J Angebranndt
(74) *Attorney, Agent, or Firm*—Young & Thompson

(57) ABSTRACT

A cyanine compound represented by formula (I):

wherein ring A and ring B each represent a substituted or unsubstituted benzene ring or a substituted or unsubstituted naphthalene ring; $R^1$, $R^2$, $R^3$, and $R^4$ each represent an alkyl group having 1 to 4 carbon atoms or a substituted or unsubstituted benzyl group, or $R^1$ and $R^2$ are taken together, or $R^3$ and $R^4$ are taken together, to form a 3- to 6-membered ring, provided that at least one of $R^1$, $R^2$, $R^3$, and $R^4$ is a substituted benzyl group; $Y^1$ and $Y^2$ each represent an organic group having 1 to 30 carbon atoms; $An^{m-}$ represents an m-valent anion; m represents an integer 1 or 2; and p represents a coefficient for maintaining overall charge neutrality.

4 Claims, 11 Drawing Sheets

FOREIGN PATENT DOCUMENTS

| | | | |
|---|---|---|---|
| JP | 03-224793 | * | 10/1991 |
| JP | 10-278426 | * | 10/1998 |
| JP | 11-227331 | | 8/1999 |
| JP | 11-277904 | | 10/1999 |
| JP | 2000-108510 | * | 4/2000 |
| JP | 2000-168233 | * | 6/2000 |
| JP | 2000-289335 | * | 10/2000 |
| JP | 2002-052829 | | 2/2002 |
| JP | 2002-067506 | * | 3/2002 |
| JP | 2003/231359 | | 8/2003 |
| WO | 99/64519 | * | 12/1999 |

OTHER PUBLICATIONS

JPO abstracts of JP 03-224793.*

Translation of JP 58-021746.*

Translation of JP 2000-289335.*

Translation of JP 2000-108510.*

Translation of JP 2000-168233.*

Translation of JP 10-278426.*

PCT Search Report Feb. 12, 2004.

* cited by examiner

Fig. 1-a
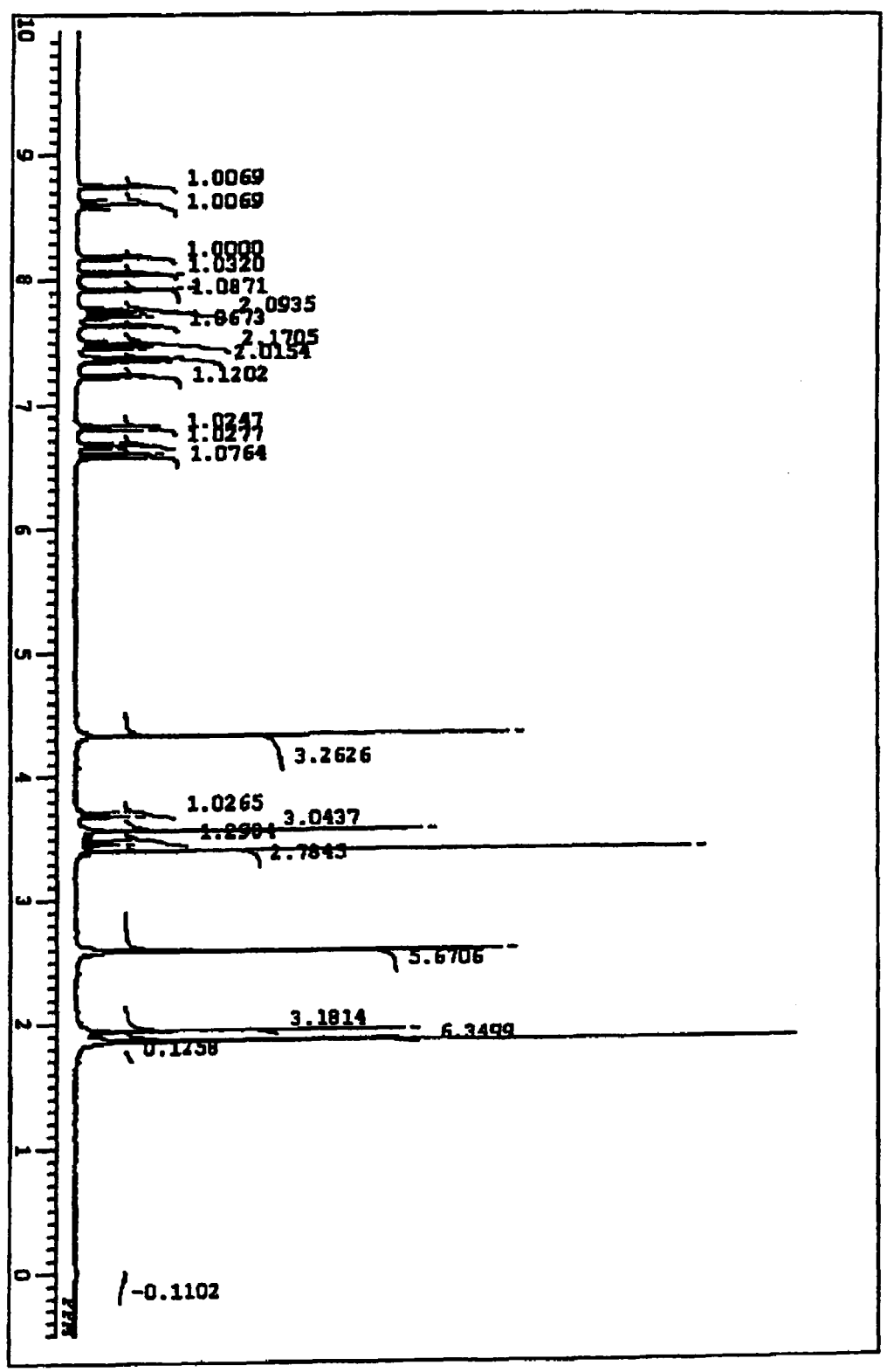

Fig. 1-b
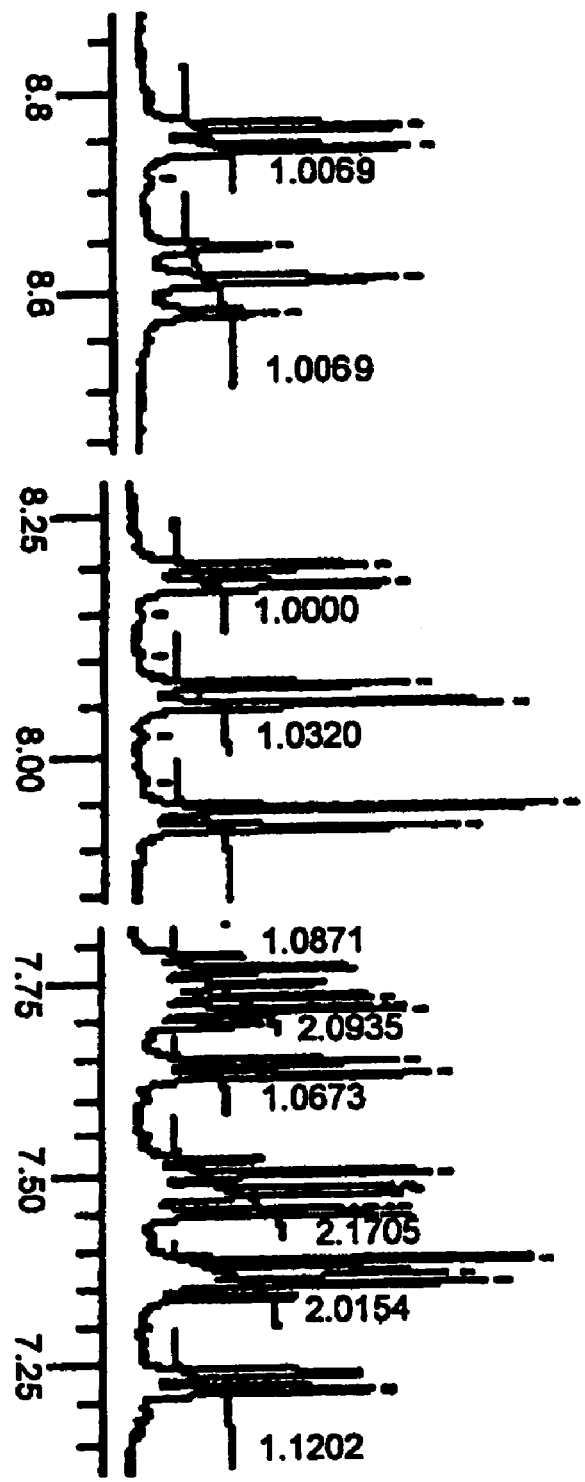

Fig. 1-c
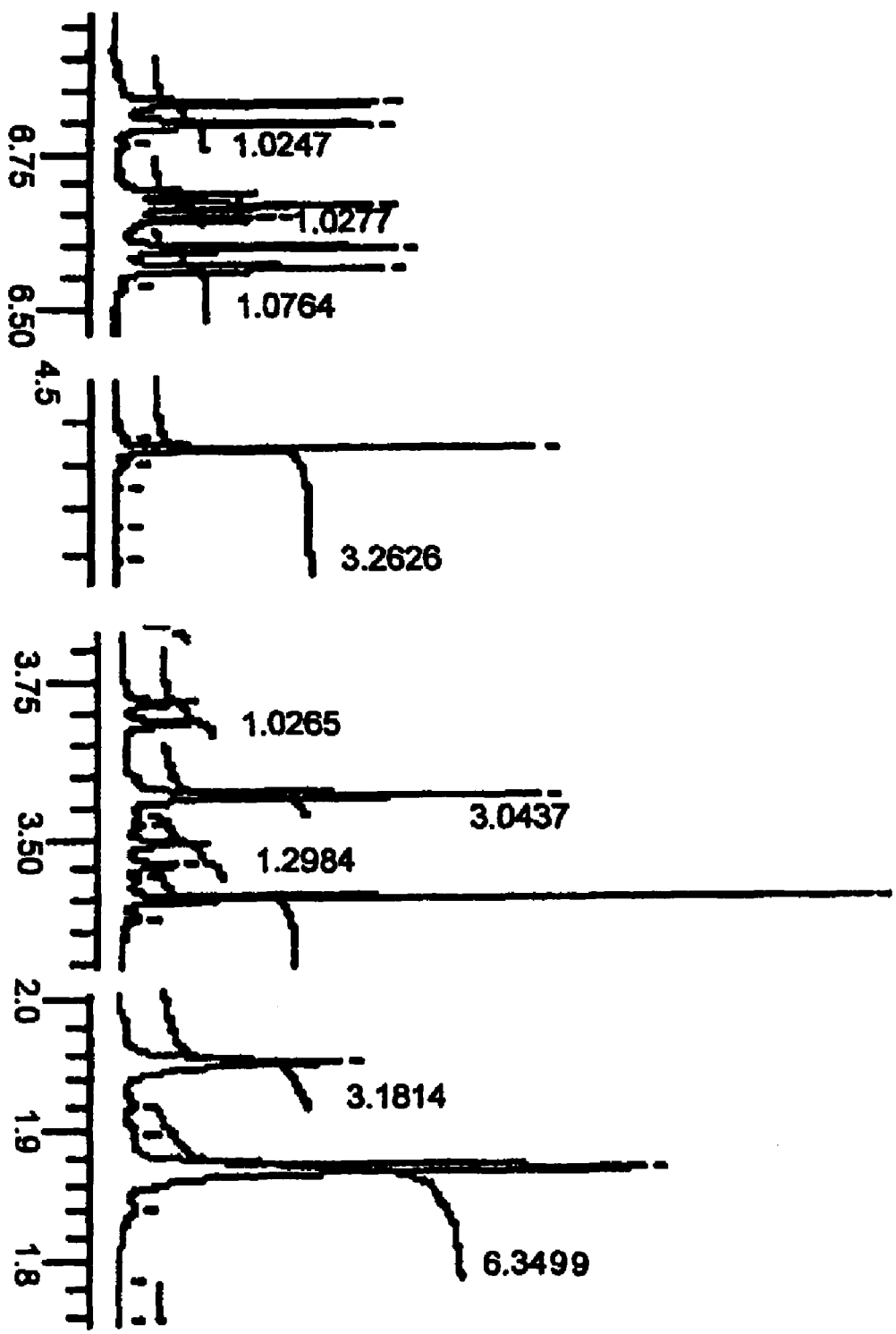

Fig. 2-a
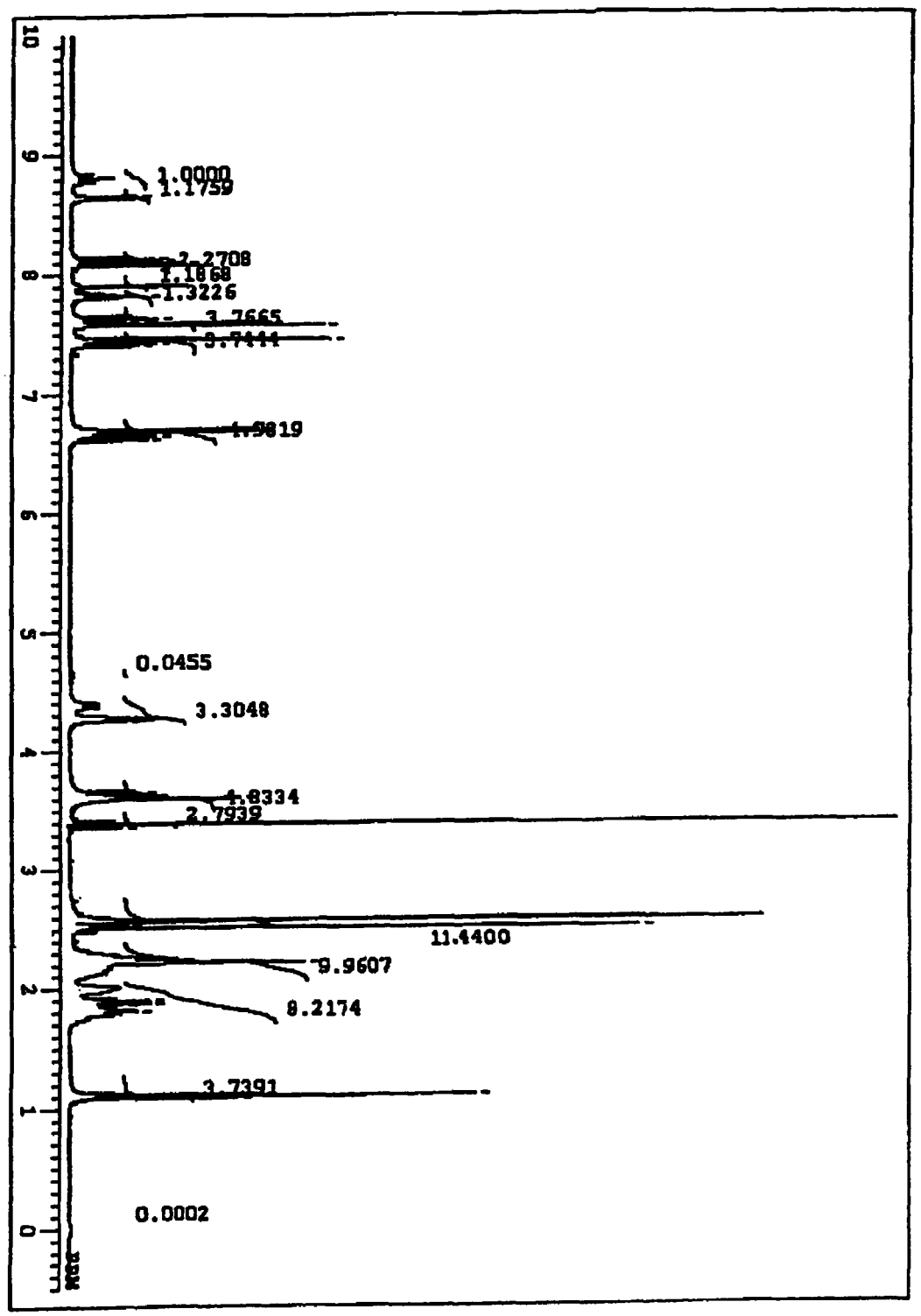

Fig. 2-b
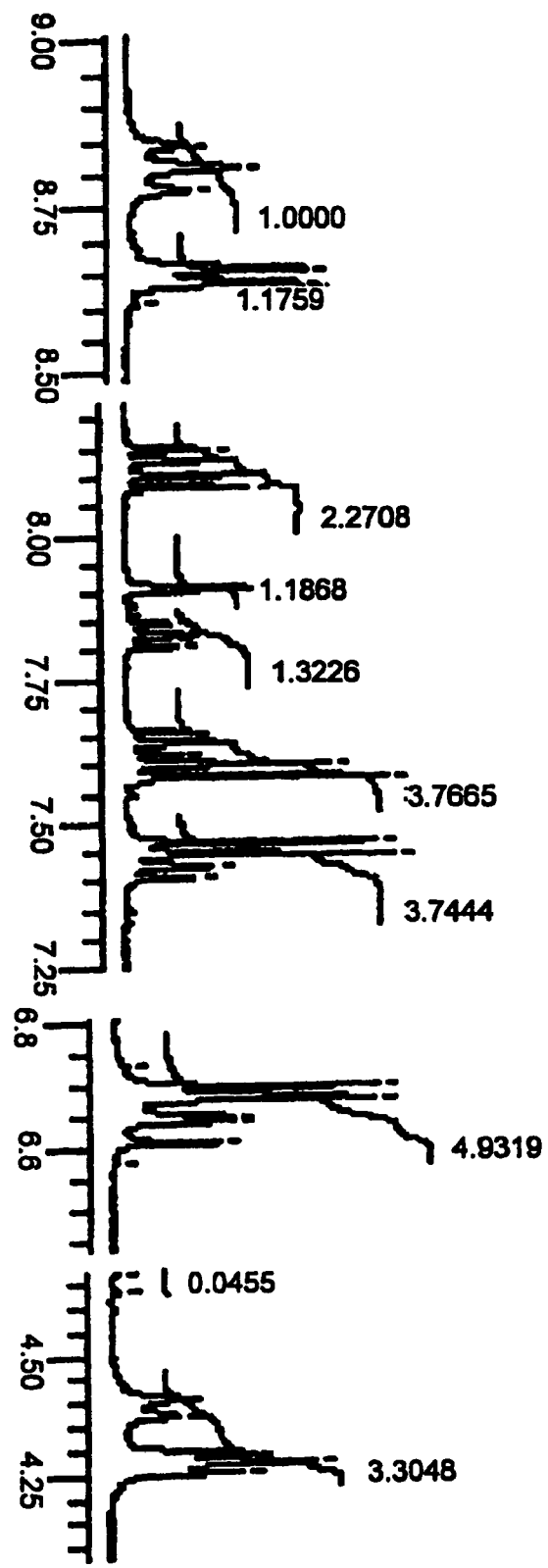

Fig. 2-c
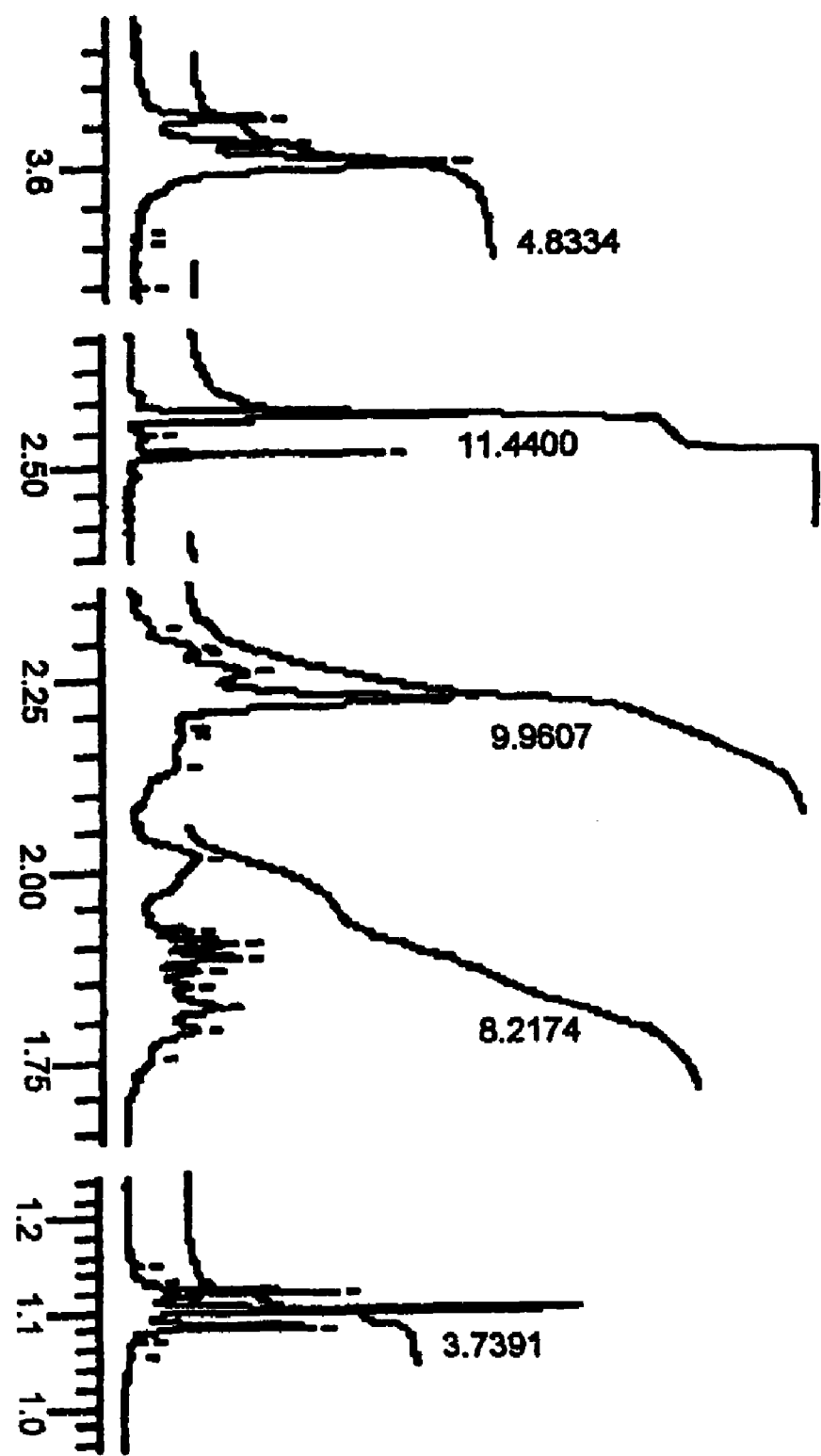

Fig. 3-a
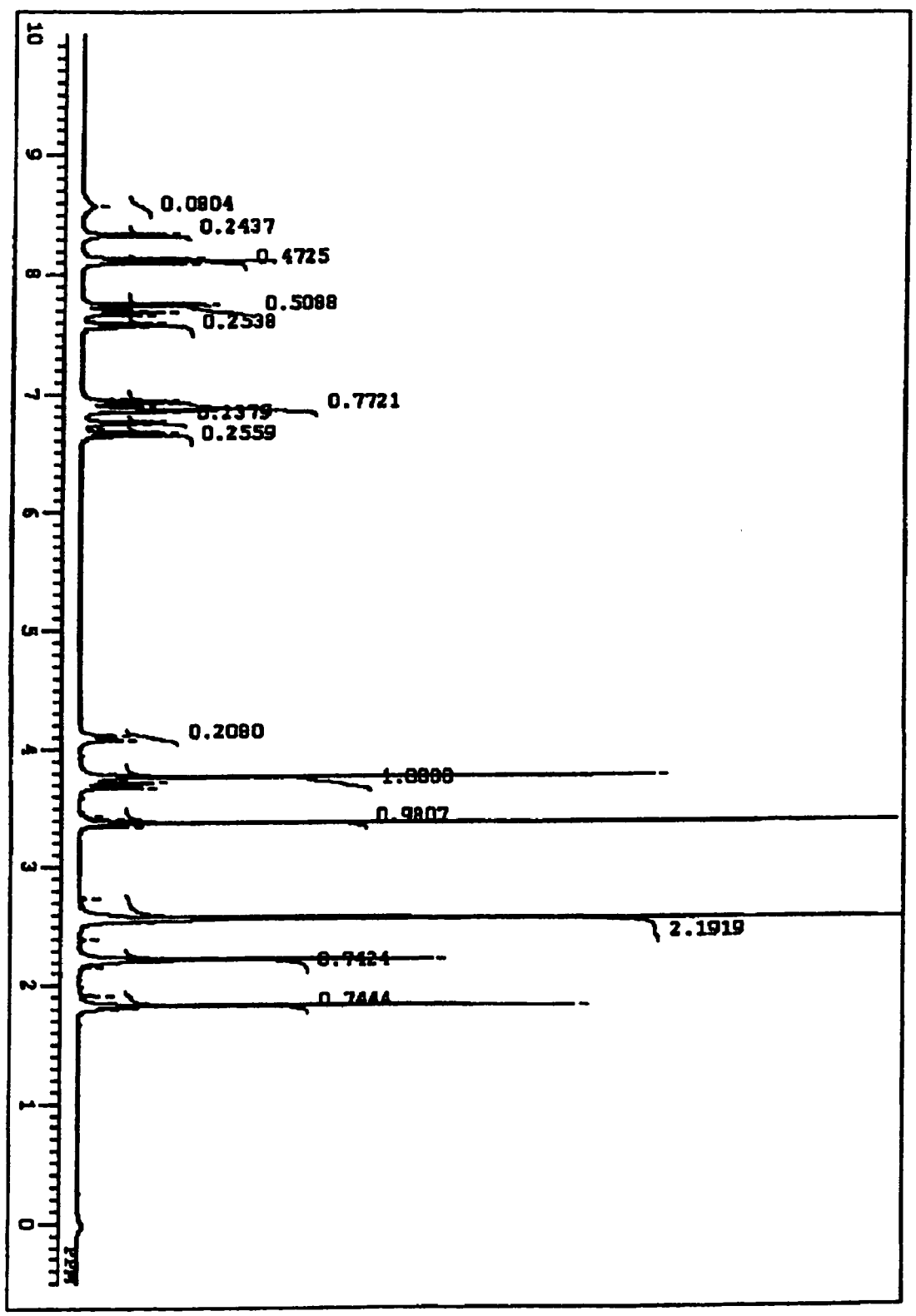

Fig. 3-b
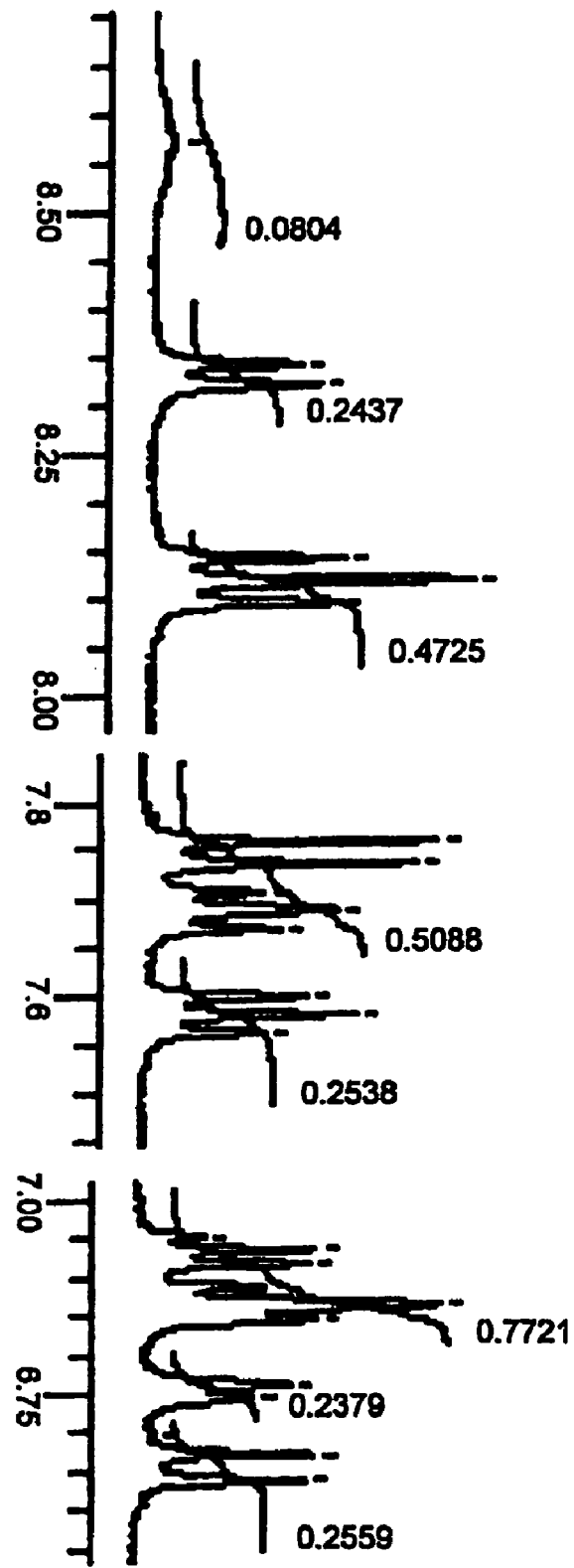

Fig. 3-c
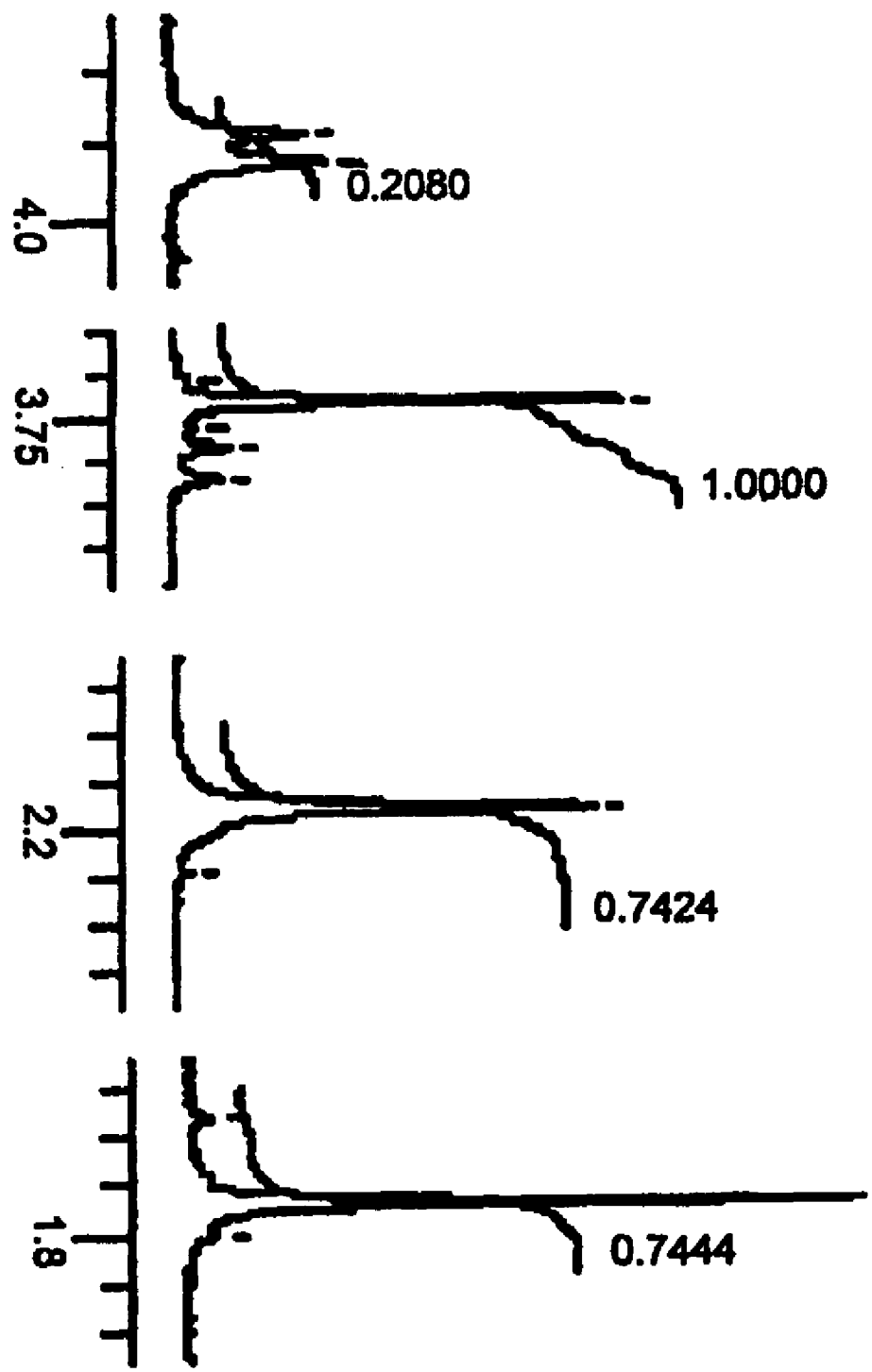

Fig. 4-a
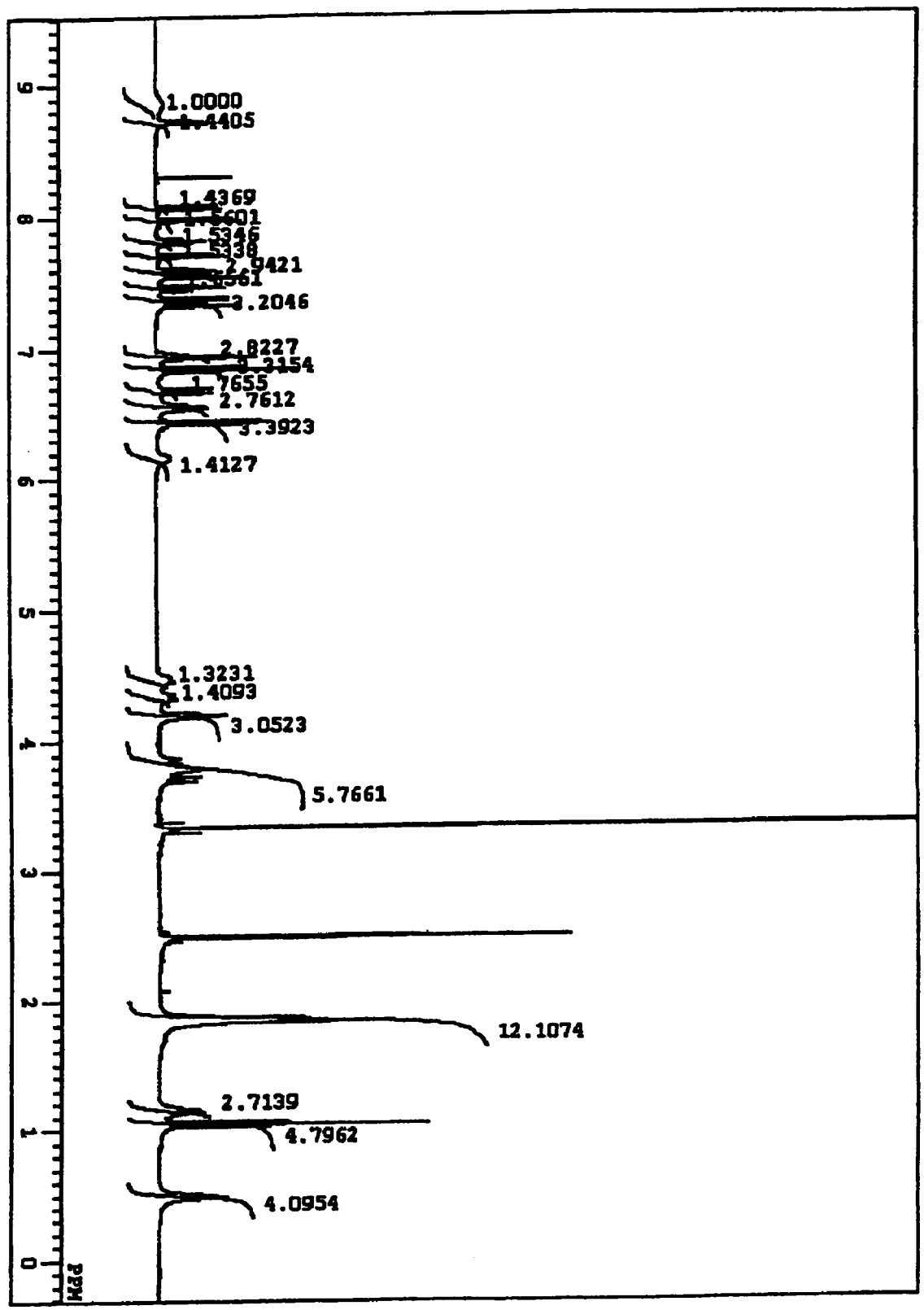

Fig. 4-b
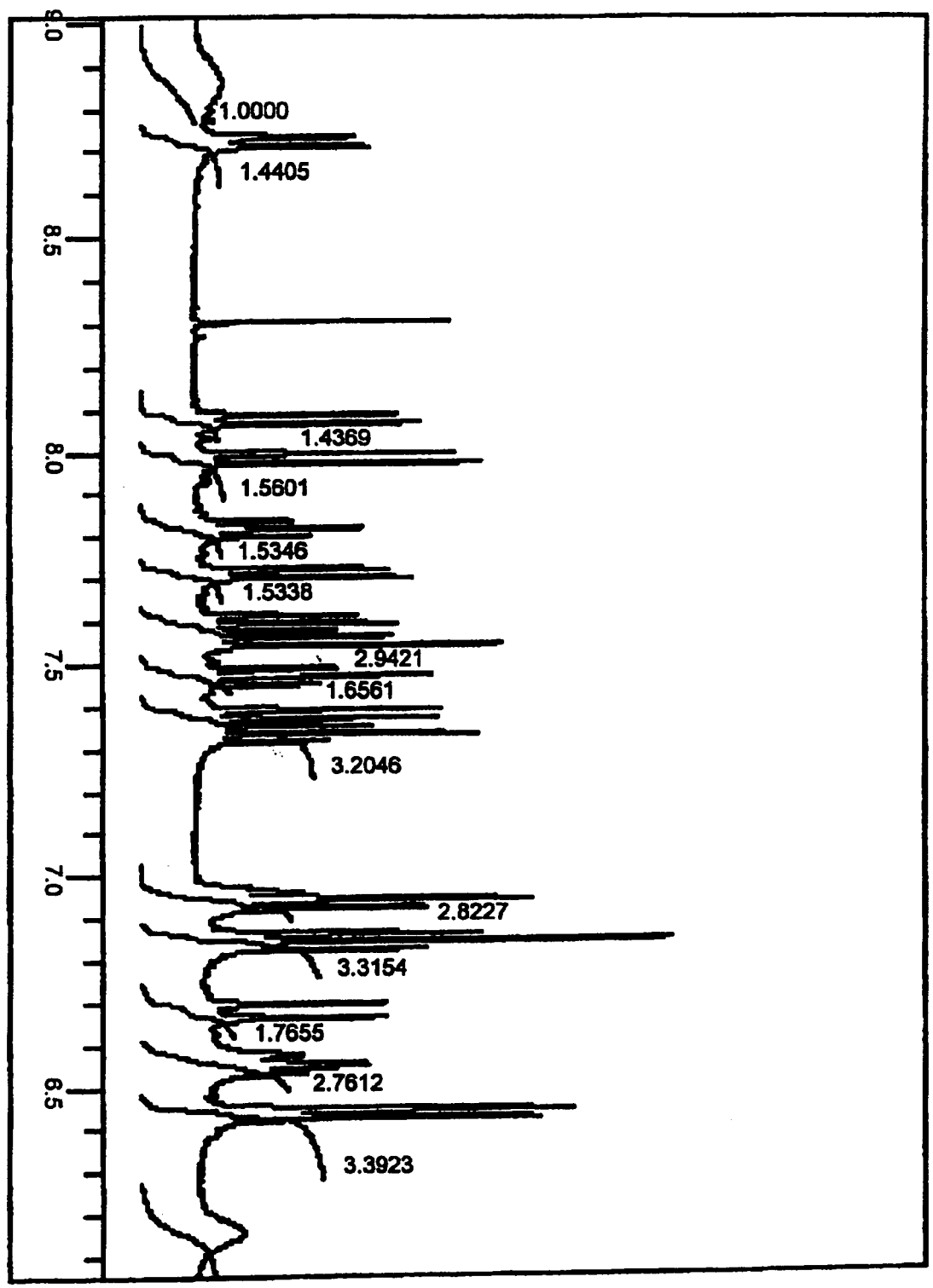

CYANINE COMPOUND, OPTICAL RECORDING MATERIAL, AND OPTICAL RECORDING MEDIUM

BACKGROUND OF THE INVENTION

1. Field of the Invention

This invention relates to a novel cyanine compound, more particularly a cyanine compound having a specific structure suitable for use as an optical element, especially as a light absorber in an optical filter of an image display device or an optical recording agent used in a laser optical recording material.

2. Description of the Related Art

Compounds having a high absorption in a wavelength range of 500 to 700 nm, especially those having an absorption peak wavelength ($\lambda_{max}$) between 550 nm and 620 nm, are used as an optical element in a recording layer of optical recording media including DVD-Rs or in an optical filter of image displays including liquid crystal displays (LCDs), plasma display panels (PDPs), electroluminescent displays (ELDs), cathode ray tube displays (CRTs), fluorescent display tubes, and field emission displays (FEDs).

High-sensitivity cyanine compounds having an indole ring have been studied as a promising optical element for these applications. Capable of coping with the increasing recording speed, the indole ring-containing cyanine compounds are reported as a recording element of optical recording media represented by DVD-Rs in not a few publications, for example, JP-A-10-278426, JP-A-11-227331, JP-A-11-277904, and JP-A-2002-52829. The first three publications disclose indole ring-containing cyanine compounds which may have an aralkyl group at the 3-position of the indole skeleton. While these cyanine compounds are relevant to the compounds of the present invention, the publications are silent on the method of introducing an aralkyl group into the cyanine compounds and the effects brought about by the introduction of an aralkyl group. In addition, these and other known cyanine compounds are unsatisfactory in thermal decomposition characteristics. Optical elements for applications to high speed recording are obviously required to have low decomposition temperatures. The compounds disclosed in the above cited four publications are unsatisfactory from that viewpoint.

SUMMARY OF THE INVENTION

The problem to be solved is that no compound is available that shows thermal decomposition behavior suitable for high-speed recording applications and is therefore useful particularly as a recording element of an optical recording medium.

An object of the present invention is to provide a novel cyanine compound exhibiting thermal behavior suitable for optical recording applications, an optical recording material containing the compound, and an optical recording medium using the recording material.

The present inventors have considered that optimization of thermal decomposition behavior and optimization of absorption wavelength would be effective in achieving high sensitivity enough to realize high-speed recording. As a result of extensive studies, they have found that the object of the invention is accomplished by a cyanine compound having a specific molecular structure.

Based on the above finding, the present invention provides a cyanine compound represented by formula (I) shown below (hereinafter referred to as a cyanine compound (I)), an optical recording material containing the cyanine compound (I) that is used to form an optical recording layer of an optical recording medium, and an optical recording medium comprising a substrate and an optical recording layer formed of the optical recording material.

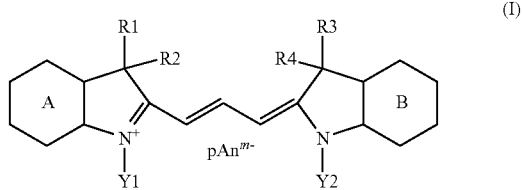

(I)

wherein ring A and ring B each represent a substituted or unsubstituted benzene ring or a substituted or unsubstituted naphthalene ring; $R^1$, $R^2$, $R^3$, and $R^4$ each represent an alkyl group having 1 to 4 carbon atoms or a substituted or unsubstituted benzyl group, or $R^1$ and $R^2$ are taken together, or $R^3$ and $R^4$ are taken together, to form a 3- to 6-membered ring, provided that at least one of $R^1$, $R^2$, $R^3$, and $R^4$ is a substituted benzyl group; $Y^1$ and $Y^2$ each represent an organic group having 1 to 30 carbon atoms; $An^{m-}$ represents an m-valent anion; m represents an integer 1 or 2; and p represents a coefficient for maintaining overall charge neutrality The present invention provides a novel cyanine compound suited for optical recording applications and an optical recording material and an optical recording medium containing the compound.

BRIEF DESCRIPTION OF THE DRAWINGS

FIG. 1-*a* is the $^1$H-NMR spectrum of the tetrafluoroborate of compound No. 3 obtained in Preparation Example 1.

FIG. 1-*b* is an enlarged segment of the spectrum of FIG. 1-*a*.

FIG. 1-*c* is an enlarged segment of the spectrum of FIG. 1-*a*.

FIG. 2-*a* is the $^1$H-NMR spectrum of the perchlorate of compound No. 20 obtained in Preparation Example 2.

FIG. 2-*b* is an enlarged segment of the spectrum of FIG. 2-*a*.

FIG. 2-*c* is an enlarged segment of the spectrum of FIG. 2-*a*.

FIG. 3-*a* is the $^1$H-NMR spectrum of the hexafluorophosphate of compound No. 43 obtained in Preparation Example 3.

FIG. 3-*b* is an enlarged segment of the spectrum of FIG. 3-*a*.

FIG. 3-*c* is an enlarged segment of the spectrum of FIG. 3-*a*.

FIG. 4-*a* is the $^1$H-NMR spectrum of the hexafluorophosphate of compound No. 57 obtained in Preparation Example 4.

FIG. 4-*b* is an enlarged segment of the spectrum of FIG. 4-*a*.

DETAILED DESCRIPTION OF THE INVENTION

The cyanine compound (I) is a novel compound having a substituted benzyl group at a specific position, which is characterized by having a lower decomposition temperature than other cyanine compounds known useful in optical recording materials for DVD-Rs and also having a proper absorption wavelength.

In formula (I), the substituent of the substituted benzene or naphthalene ring represented by ring A or ring B includes a halogen atom, such as fluorine, chlorine, bromine or iodine; an alkyl group, such as methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl or 2-ethylhexyl; an aryl group, such as phenyl, naphthyl, 2-methylphenyl, 3-methylphenyl, 4-methylphenyl, 4-vinylphenyl or 3-isopropylphenyl; an alkoxy group, such as methoxy, ethoxy, propoxy, isopropoxy, butoxy, sec-butoxy or tert-butoxy; an alkylthio group, such as methylthio, ethylthio, propylthio, isopropylthio, butylthio, sec-butylthio or tert-butylthio; a nitro group, and a cyano group. The alkyl group having 1 to 4 carbon atoms as represented by $R^1$, $R^2$, $R^3$, and $R^4$ includes methyl, ethyl, propyl, isopropyl, butyl, sec-butyl, tert-butyl, and isobutyl. The 3- to 6-membered ring formed by the connection of $R^1$ and $R^2$ or the connection of $R^3$ and $R^4$ includes cyclopropan-1,1-diyl, cyclobutan-1,1-diyl, 2,4-dimethylcyclobutan-1,1-diyl, 3,3-dimethylcyclobutan-1,1-diyl, cyclopentan-1,1-diyl, cyclohexan-1,1-diyl, tetrahydropyran-4,4-diyl, thian-4,4-diyl, piperidin-4,4-diyl, N-substituted piperidin-4,4-diyl, morpholin-2,2-diyl, morpholin-3,3-diyl, N-substituted morpholin-3,3-diyl, and N-substituted morpholin-2,2-diyl, in which the N-substituent includes the substituents that may be present in ring A or B.

At least one of $R^1$, $R^2$, $R^3$, and $R^4$ is a substituted benzyl group having 1 to 5 substituents. The substituents are selected from a hydroxyl group; a halogen atom, such as fluorine, chlorine, bromine or iodine; an alkyl group, such as methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl or 2-ethylhexyl, which may be substituted with a halogen atom; an alkoxy group, such as methoxy, ethoxy, propoxy, isopropoxy, butoxy, sec-butoxy or tert-butoxy, which may be substituted with a halogen atom; an alkylthio group, such as methylthio, ethylthio, propylthio, isopropylthio, butylthio, sec-butylthio or tert-butylthio; a nitro group, a cyano group, and the like. A bulkier substituted benzyl group reduces the molar absorptivity of the cyanine compound (I) and can affect the sensitivity. From that viewpoint, the substituted benzyl group is preferably represented by formula (II):

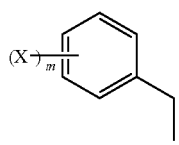

(II)

wherein m represents an integer 1 or 2; X represents a hydroxyl group, a halogen group, a cyano group, a nitro group, an alkyl group having 1 to 4 carbon atoms, a halogen-substituted alkyl group having 1 to 4 carbon atoms, an alkoxy group having 1 to 4 carbon atoms or a halogen-substituted alkoxy group having 1 to 4 carbon atoms; when m is 2, the two substituents X's may be the same or different.

In formula (II), the halogen atom as X includes fluorine, chlorine, bromine, and iodine. The alkyl group having 1 to 4 carbon atoms includes methyl, ethyl, propyl, isopropyl, butyl, sec-butyl, tert-butyl, and isobutyl. The halogen-substituted alkyl group having 1 to 4 carbon atoms includes chloromethyl, dichloromethyl, trichloromethyl, bromomethyl, dibromomethyl, tribromomethyl, fluoromethyl, difluoromethyl, trifluoromethyl, perfluoroethyl, perfluoropropyl, and perfluorobutyl. The alkoxy group having 1 to 4 carbon atoms includes methoxy, ethoxy, propoxy, isopropoxy, butoxy, sec-butoxy, and tert-butoxy. The halogen-substituted alkoxy group having 1 to 4 carbon atoms includes chloromethoxy, dichloromethoxy, trichloromethoxy, bromomethoxy, dibromomethoxy, tribromomethoxy, fluoromethoxy, difluoromethoxy, trifluoromethoxy, perfluoroethoxy, perfluoropropoxy, and perfluorobutoxy.

In formula (I), the organic group having 1 to 30 carbon atoms as $Y^1$ or $Y^2$ includes an alkyl group, e.g., methyl, ethyl, propyl, isopropyl, butyl, sec-butyl, tert-butyl, isobutyl, amyl, isoamyl t-amyl, hexyl, cyclohexyl, cyclohexylmethyl, 2-cyclohexylethyl, heptyl, isoheptyl, t-heptyl, n-octyl, isooctyl, t-octyl, 2-ethylhexyl, nonyl, isononyl, decyl, dodecyl, tridecyl, tetradecyl, pentadecyl, hexadeyl, heptadecyl or octadecyl; an alkenyl group, e.g., vinyl, 1-methylethenyl, 2-methylethenyl, propenyl, butenyl, isobutenyl, pentenyl, hexenyl, heptenyl, octenyl, decenyl, pentadecenyl or 1-phenylpropen-3-yl; an alkyl-substituted or unsubstituted aryl group, e.g., phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl or cyclohexylphenyl; and an arylalkyl group, e.g., benzyl, phenethyl, 2-phenylpropan-2-yl, diphenylmethyl, triphenylmethyl, styryl or cinnamyl. The organic group as $Y^1$ or $Y^2$ further includes the above-recited hydrocarbon groups which contain an ether linkage or a thioether linkage, such as 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl, and 2-phenylthioethyl. The organic groups recited above as $Y^1$ or $Y^2$ may be substituted with an alkoxy group, an alkenyl group, a nitro group, a cyano group, a halogen atom, etc.

A bulkier organic group as $Y^1$ or $Y^2$ reduces the molar absorptivity of the cyanine compound (I) and can affect the sensitivity. From that viewpoint, the organic group is preferably selected from hydrocarbon groups having 1 to 8 carbon atoms, particularly alkyl groups having 1 to 8 carbon atoms.

Of the anions represented by $An^{m-}$ monovalent ones include halide anions, e.g., chloride, bromide, iodide and fluoride anions; inorganic anions, such as perchlorate, chlorate, thiocyanate, hexafluorophosphate, hexafluoroantimonate, and tetrafluoroborate anions; organic sulfonate anions, such as benzenesulfonate, toluenesulfbnate, trifluoromethanesulfonate, diphenylamine-4-sulfonate, 2-amino-4-methyl-5-chlorobenzenesulfonate, and 2-amino-5-nitrobenzenesulfonate anions; and organophosphate anions, such as octylphosphate, dodecylphosphate, octadecylphosphate, phenylphosphate, nonylphenylphosphate, and 2,2'-methylenebis(4,6-di-t-butylphenyl)phosphonate anions. Divalent ones include benzenedisulfonate and naphthalenedisulfonate anions. If desired, a quencher anion capable of deexciting (quenching) an active molecule in an excited state, a metallocene compound anion of, for example, a ferrocene or ruthenocene compound having an anionic group (e.g., carboxyl, phosphonic or sulfonic group) on the cyclopentadienyl ring, and the like can be used.

The quencher anion includes those represented by formulae (A) or (B) shown below and those described in JP-A-60-234892, JP-A-5-43814, JP-A-6-239028, JP-A-9-309886, and JP-A-10-45767.

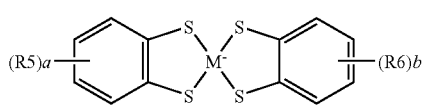

(A)

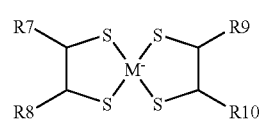

(B)

wherein M represents nickel or copper; $R^5$ and $R^6$ each represent a halogen atom, an alkyl group having 1 to 8 carbon atoms, an aryl group having 6 to 30 carbon atoms or —$SO_2$-Z; Z represents an alkyl group, an aryl group, a halogen-substituted aryl group, a dialkylamino group, a diarylamino group, a piperidino group or a morpholino group; a and b each represent an integer of 0 to 4; and $R^7$, $R^8$, $R^9$, and $R^{10}$ each represent an alkyl group, an alkylphenyl group, an alkoxyphenyl group or a halogen-substituted phenyl group.

The following is specific examples of the cyanine compound (I). The formulae shown are cation moieties of the cyanine compounds (I).

Compound No. 1

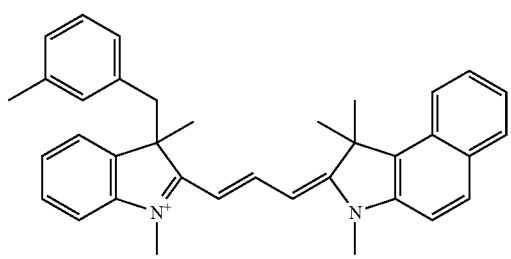

Compound No. 2

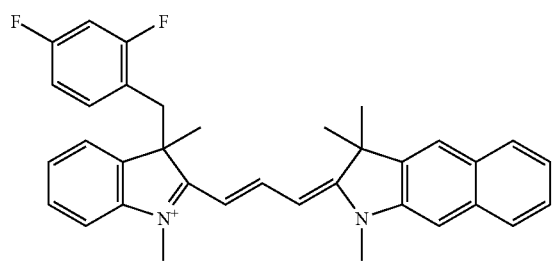

Compound No. 3

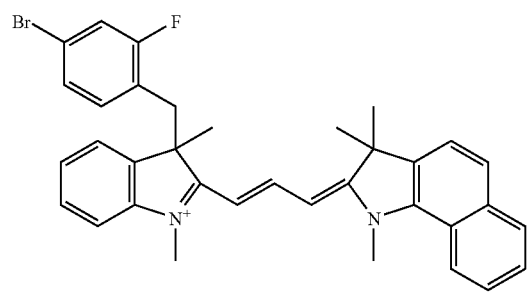

-continued

Compound No. 4

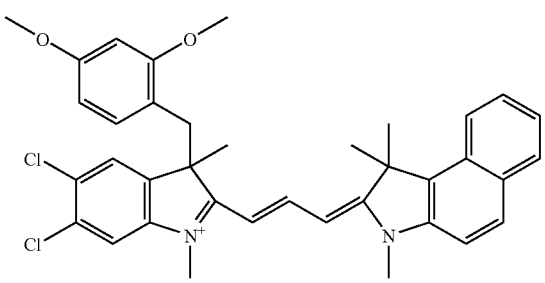

Compound No. 5

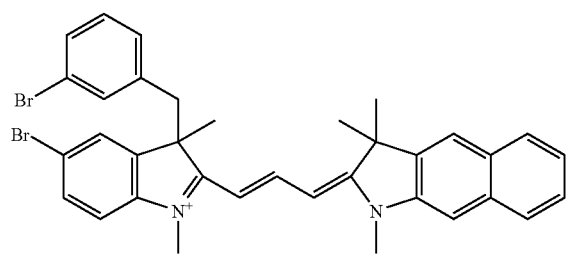

Compound No. 6

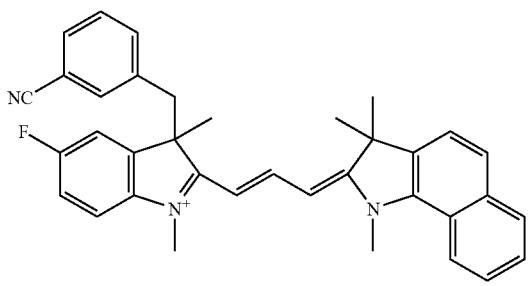

Compound No. 7

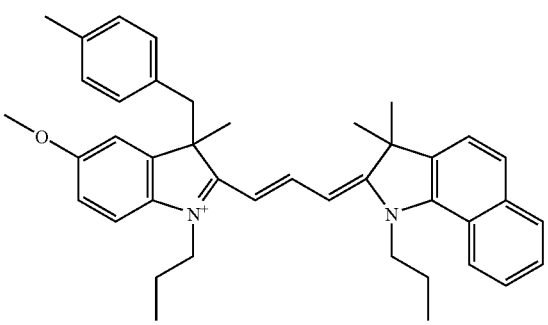

Compound No. 8

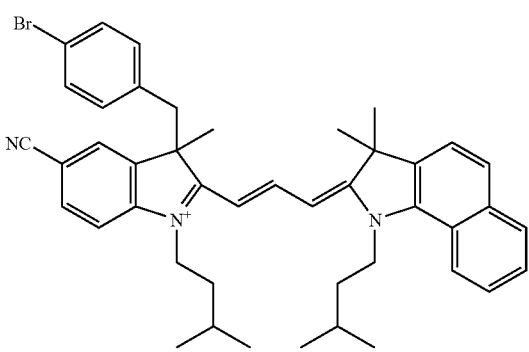

Compound No. 9
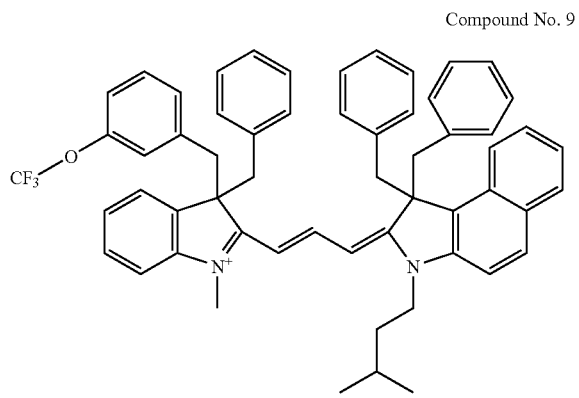
Compound No. 10
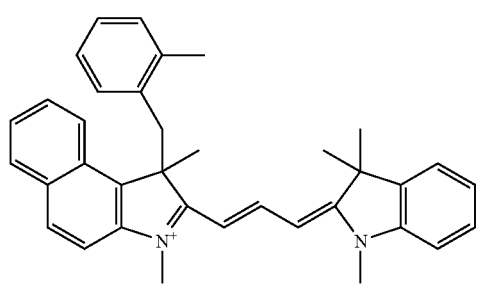
Compound No. 11
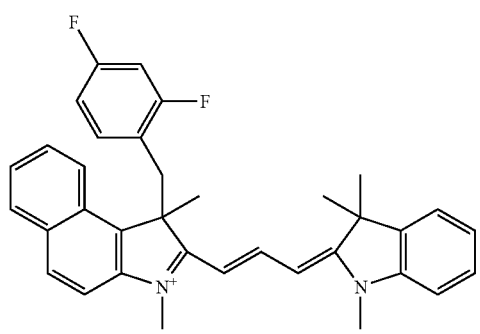
Compound No. 12
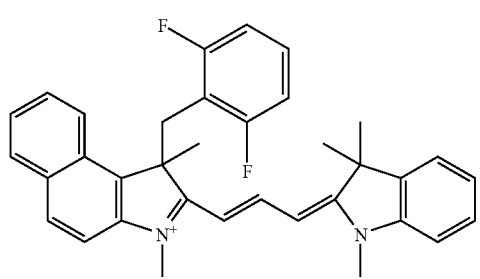
Compound No. 13
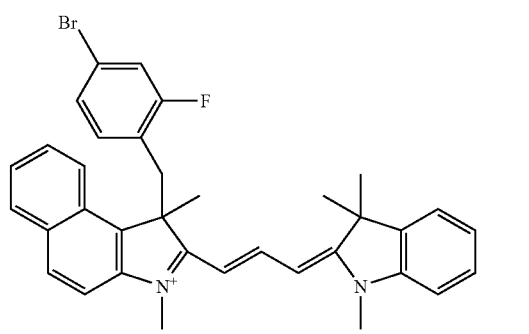
Compound No. 14
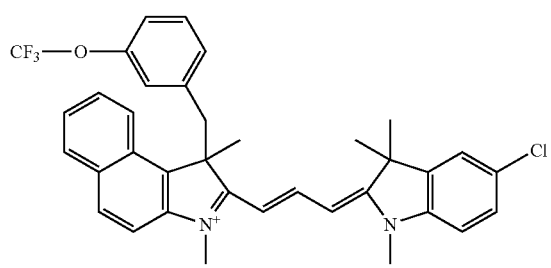
Compound No. 15
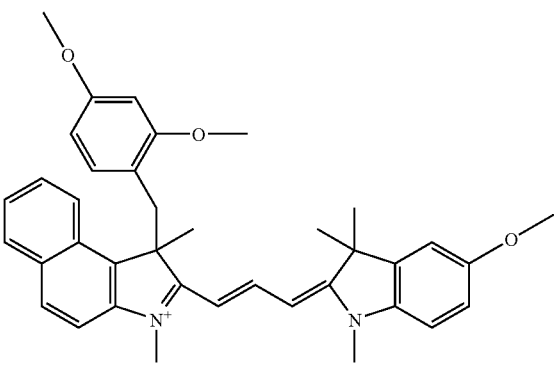
Compound No. 16
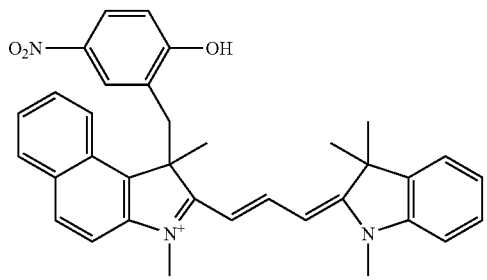

-continued
Compound No. 17
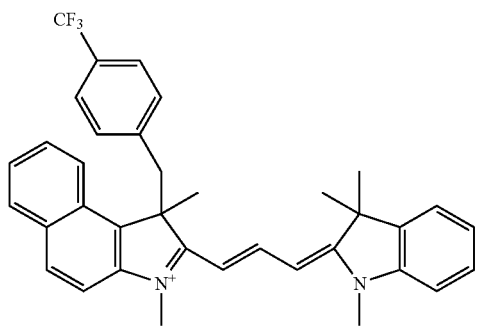
Compound No.18
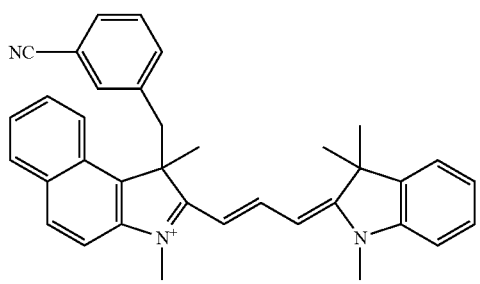
Compound No. 19
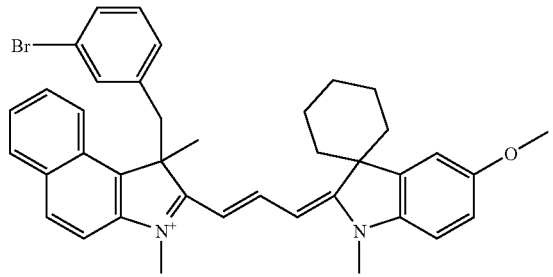
Compound No. 20
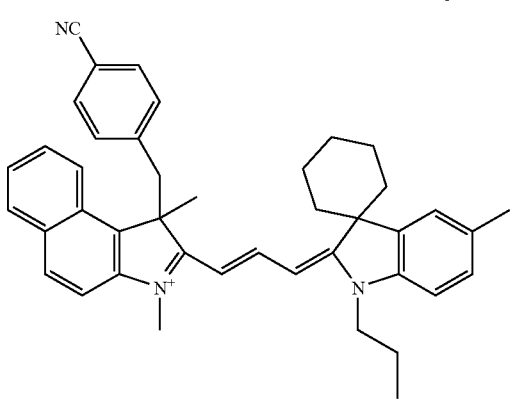
-continued
Compound No. 21
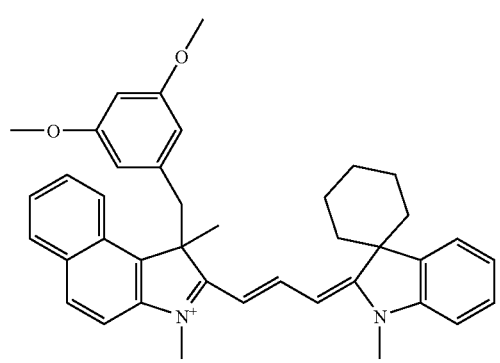
Compound No. 22
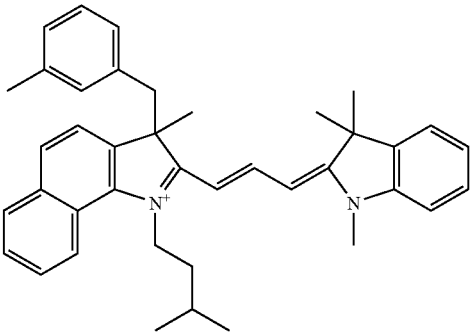
Compound No.23
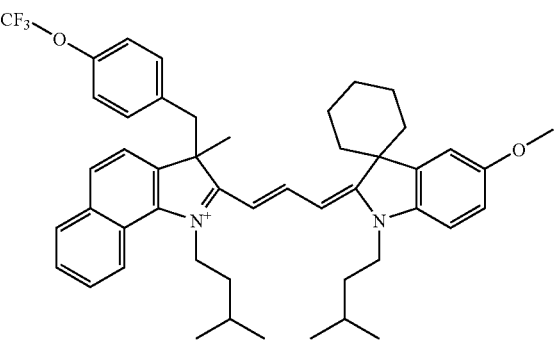
Compound No. 24
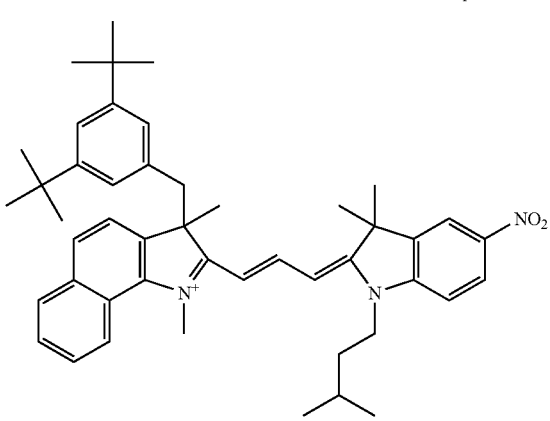

-continued
Compound No.25
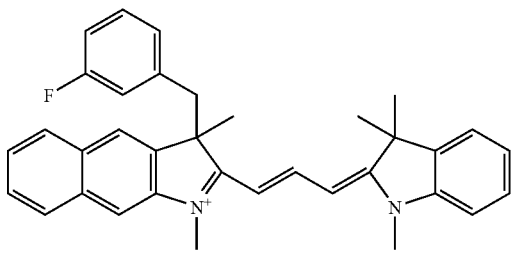
Compound No. 26
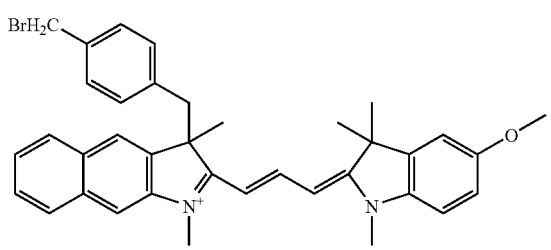
Compound No. 27
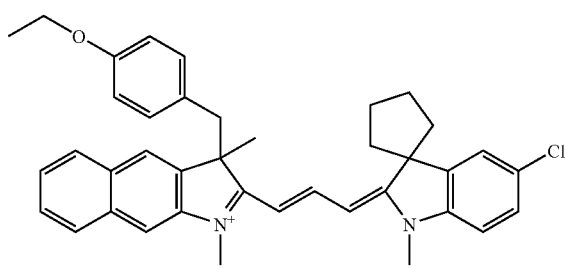
Compound No. 28
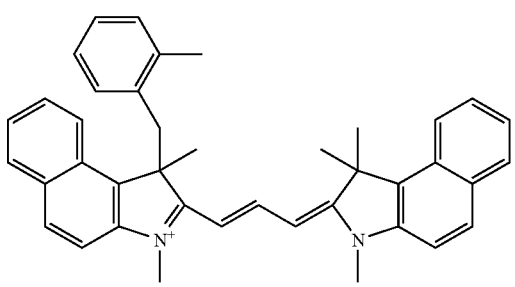
Compound No. 29
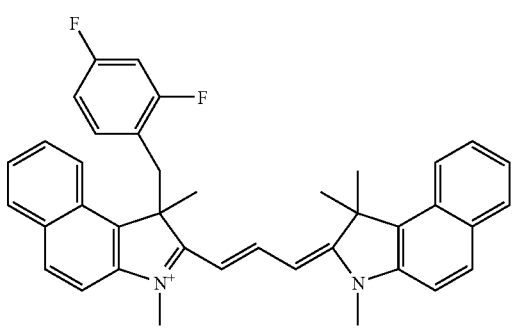
-continued
Compound No. 30
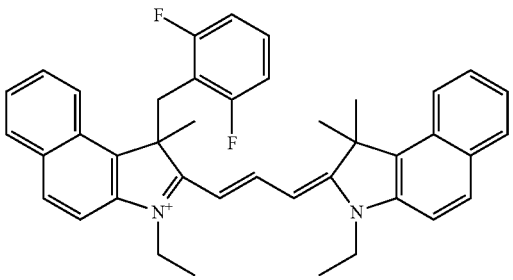
Compound No. 31
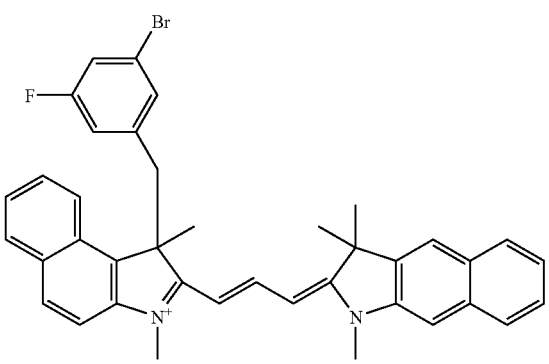
Compound No. 32
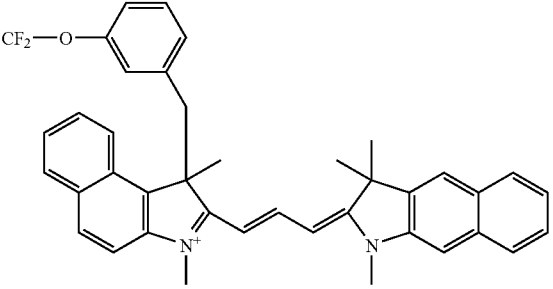
Compound No. 33
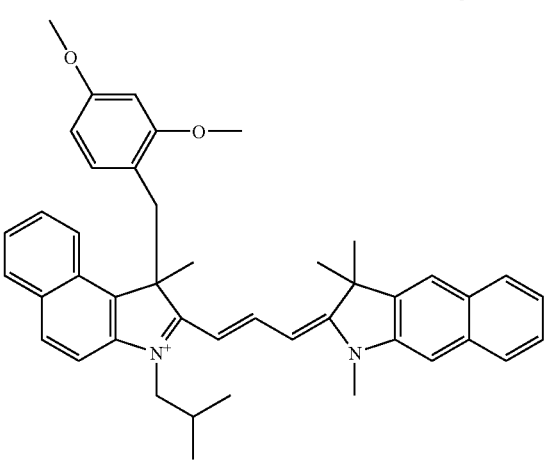

-continued
Compound No. 34
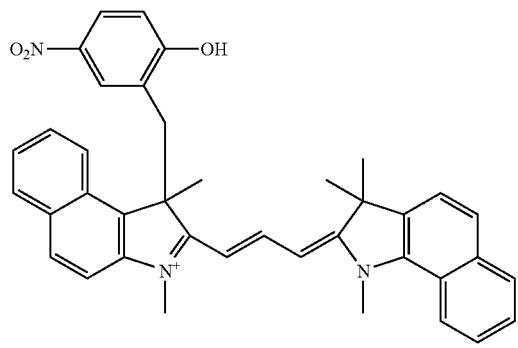
Compound No. 35
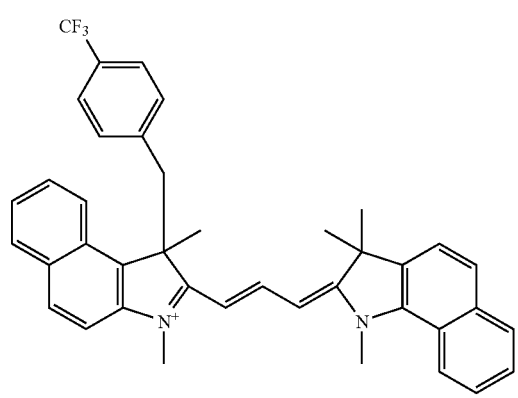
Compound No. 36
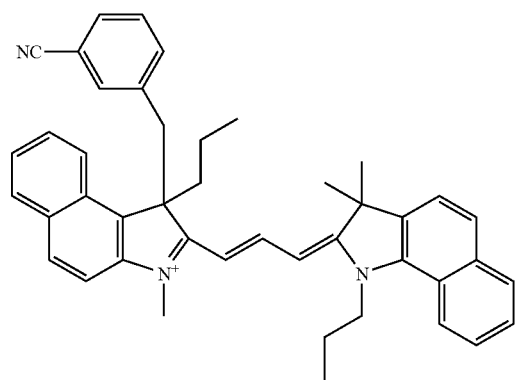
Compound No. 37
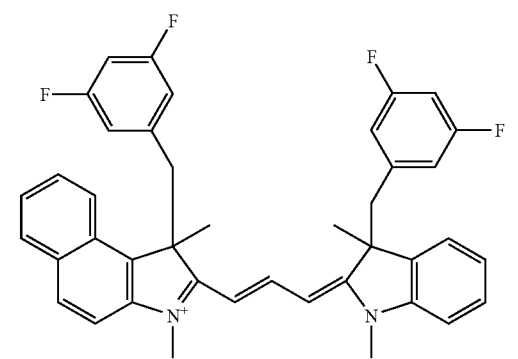
-continued
Compound No. 38
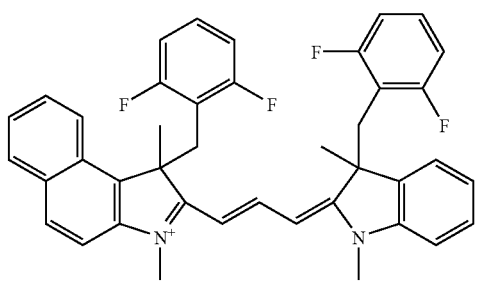
Compound No. 39
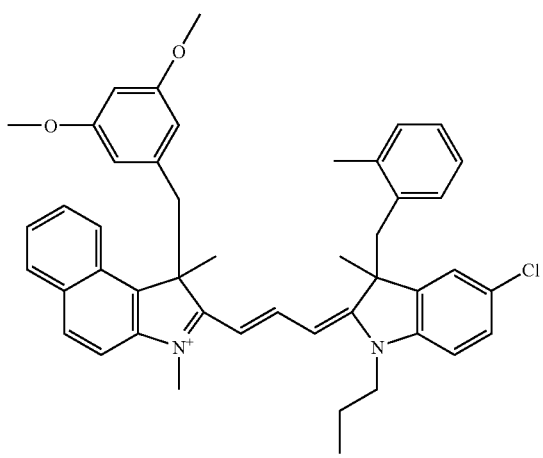
Compound No. 40
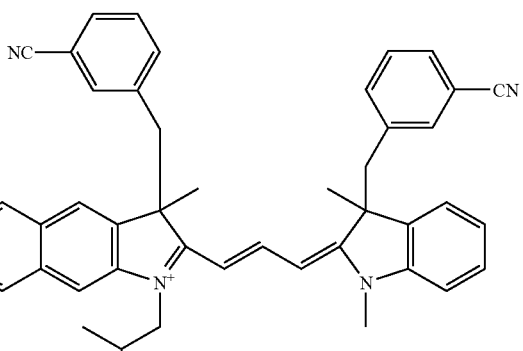
Compound No. 41
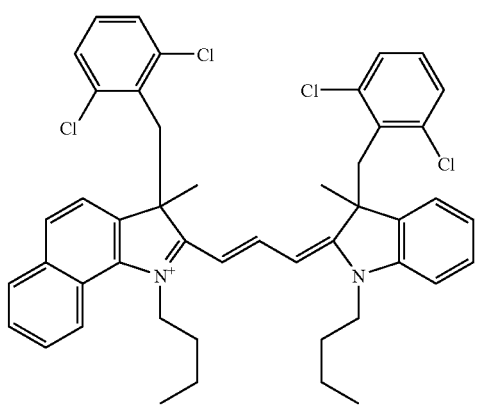

-continued
Compound No. 42
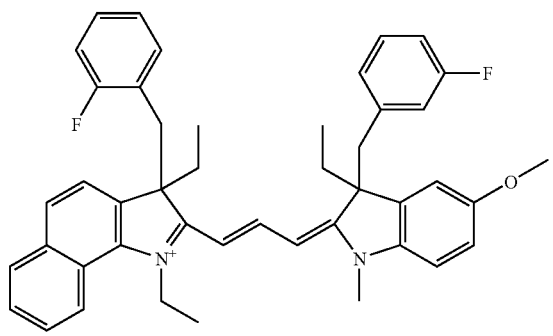
Compound No. 43
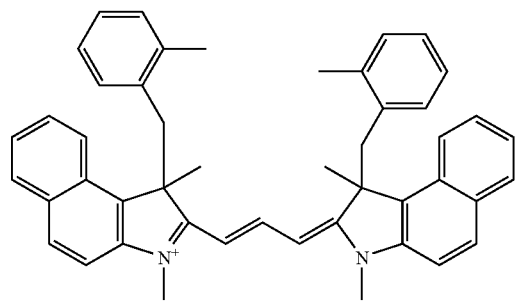
Compound No. 44
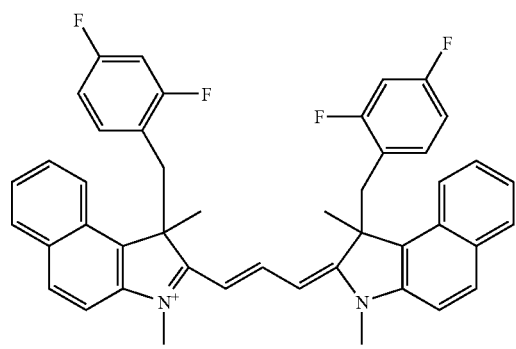
Compound No. 45
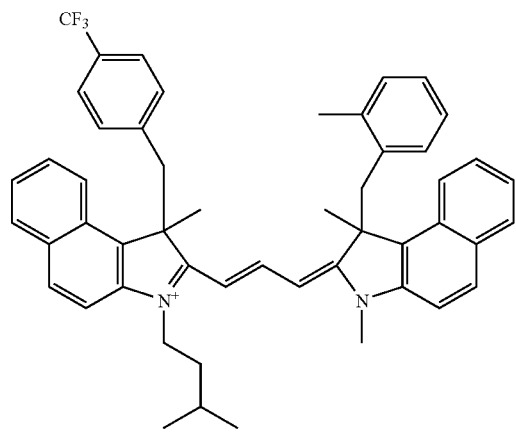
-continued
Compound No. 46
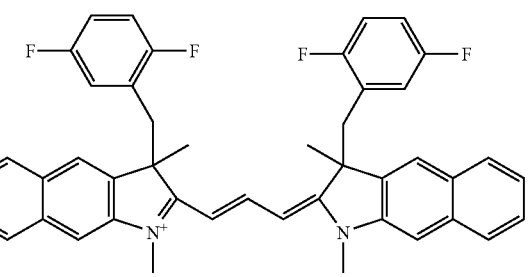
Compound No. 47
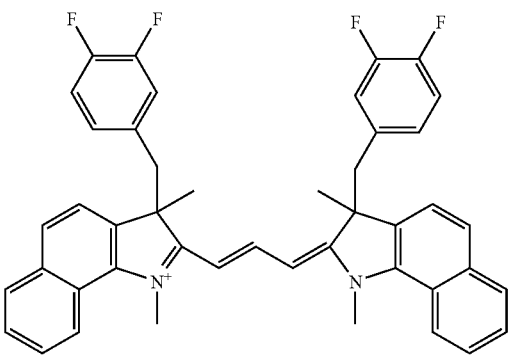
Compound No. 48
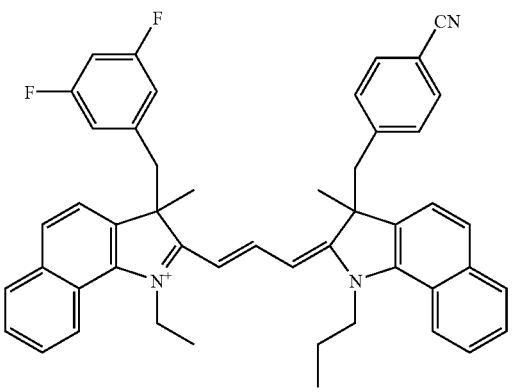
Compound No. 49
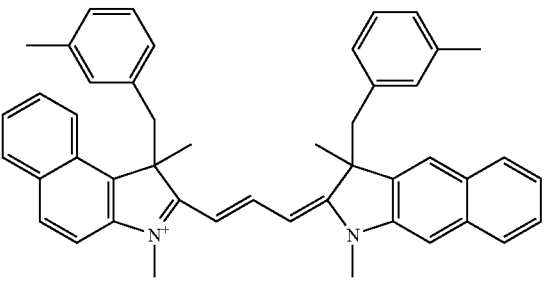

-continued
Compound No. 50
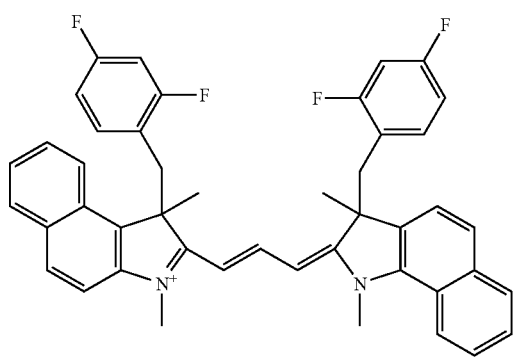
Compound No. 51
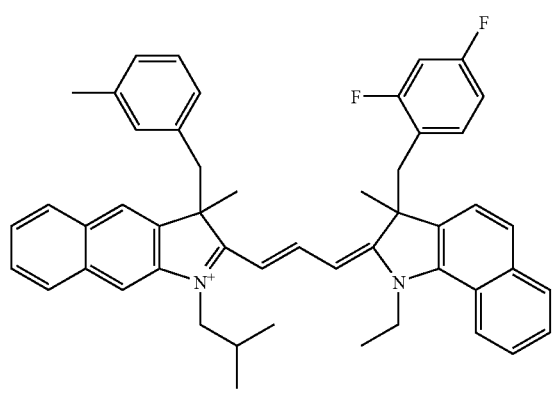
Compound No. 52
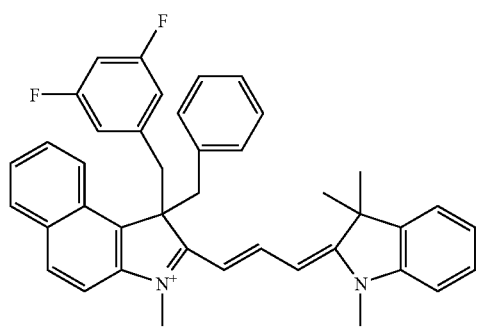
Compound No. 53
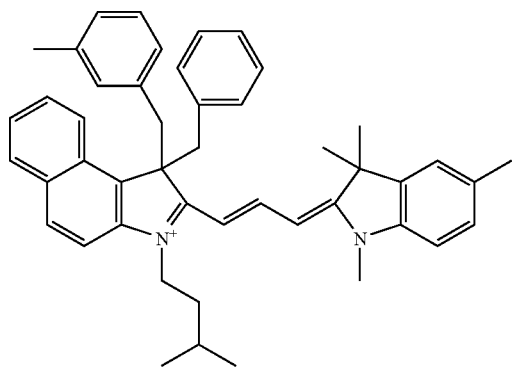
-continued
Compound No. 54
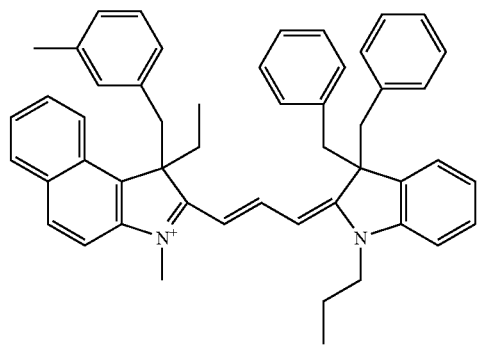
Compound No. 55
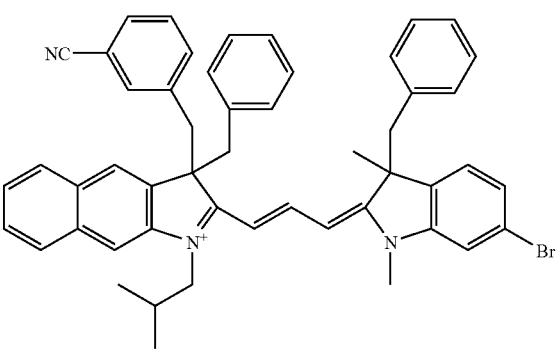
Compound No. 56
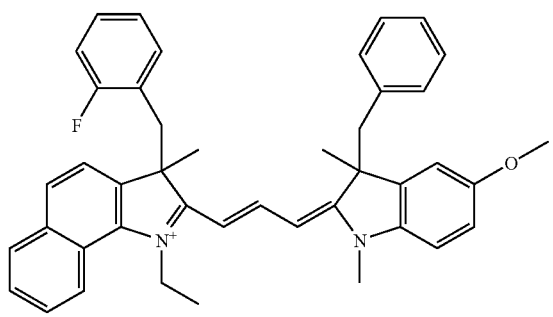
Compound No. 57
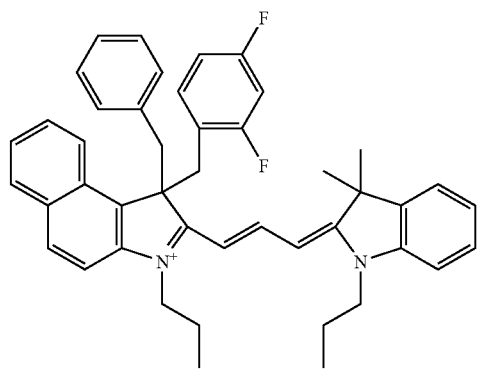

-continued

Compound No. 58

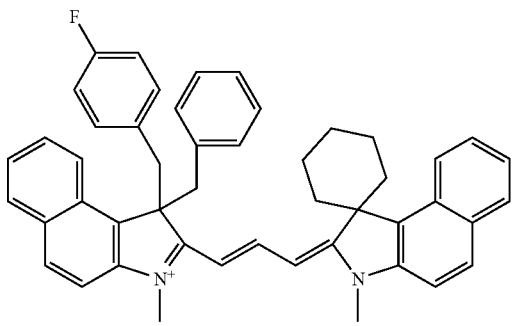

Compound No. 59

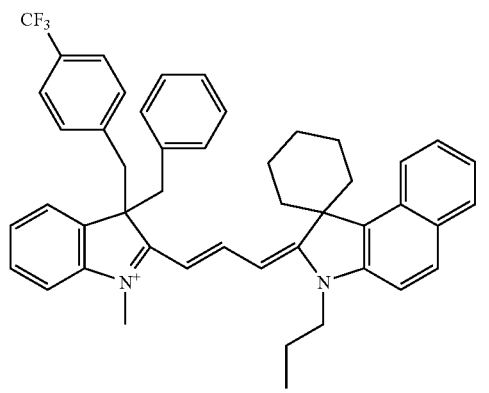

Compound No. 60

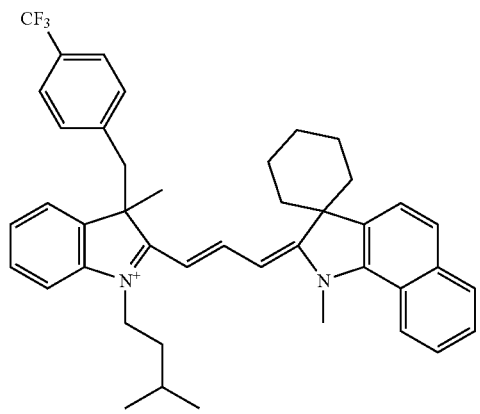

Of the cyanine compounds (I) preferred are those in which the indole skeleton having the substituted benzyl group (as $R^1$, $R^2$, $R^3$ or $R^4$) is a benzoindole skeleton (in which ring A or ring B is a substituted or unsubstituted naphthalene ring) (e.g., compound Nos. 10 to 58) because of their excellent thermal behavior for use as an optical recording material. Still preferred of them are those in which the benzene ring of the benzoindole ring is fused to the e-face of the indole ring (e.g., compound Nos. 10 to 21, 28 to 39, 43 to 45, 49, 50, 52 to 54, 58, and 58). It is considered that the excellent thermal behaivior results from these preferred compounds having their ring structure distorted due to steric hindrance between the substituted benzyl group and the benzoindole ring.

The cyanine compound (I) is not restricted by the process of preparation. The cyanine compound (I) is obtained by, for example, linking two intermediate compounds, 2-methylindole quaternary salt derivatives, using a bridging agent, such as N,N'-diphenylamidine. The substituted benzyl group can be introduced in the course of preparing the 2-methylindole quaternary salt derivative. For example, an X-substituted benzyl group can be introduced by forming an indole ring from an arylhydrazine derivative and a 2-butanone derivative having an X-substituted phenyl group at the 4-position, or by allowing an indole ring to react with a halogenated methylbenzene derivative. $Y^1$ or $Y^2$ can be introduced by using $Y^1$-D or $Y^2$-D (wherein D is a halogen atom, e.g., Cl, Br or I, or a sulfonyloxy group, e.g., phenylsulfonyloxy, 4-methylphenylsulfonyloxy or 4-chlorophenylsulfonyloxy) reactive with NH of an arylamine derivative or an indole ring. The 2-butanone derivative having an X-substituted phenyl group at the 4-position is easily obtained by the reaction of an X-substituted benzaldehyde with acetone. A typical route for preparing the cyanine compound (I) is as follows.

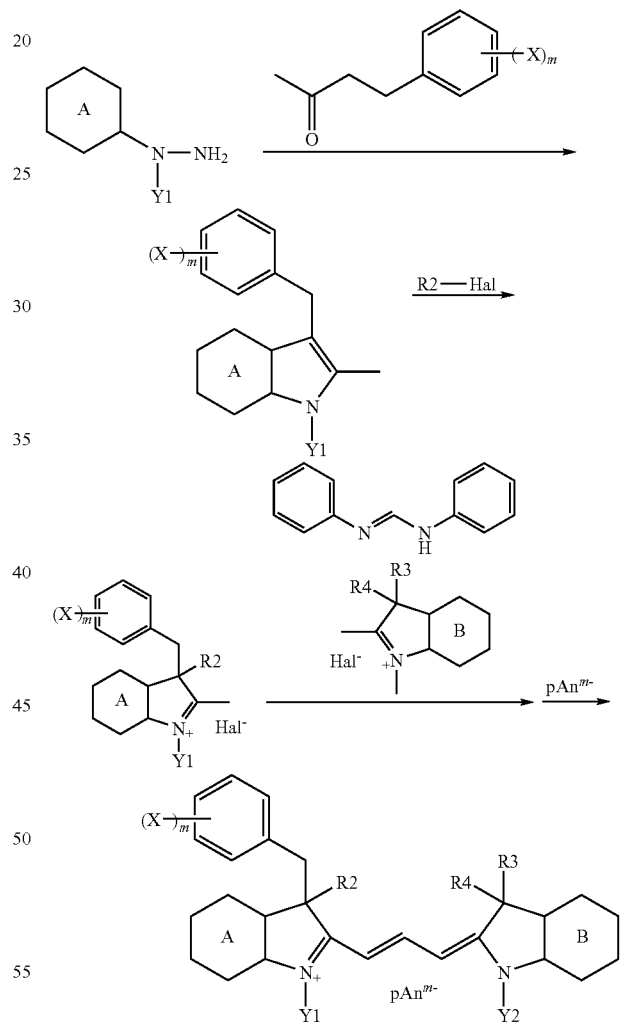

wherein ring A, ring B, $R^2$, $R^3$, $R^4$, X, $Y^1$, $Y^2$ $An^{m-}$, m, and p are as defined above; and Hal represents chlorine, bromine or iodine.

The cyanine compound (I) functions as an optical element. It is especially suited for use in an optical recording layer of an optical recording medium. The optical recording layer containing the cyanine compound (I) is formed in a thin film form on a substrate by using an optical recording material containing the cyanine compound (I). The term "optical recording material" as used herein denotes a material used to form the optical recording layer and includes not only the cyanine compound (I) per se but mixtures of the cyanine compound (I) and other components, such as an organic solvent and other compounds hereinafter described.

The optical recording layer of the optical recording media is generally formed by wet coating techniques using a solution of the cyanine compound (I) and, if desired, other compounds in an organic solvent. Suitable organic solvents include lower alcohols, such as methanol and ethanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; hydrocarbons, such as benzene, toluene, and xylene; and chlorinated hydrocarbons, such as methylene dichloride, dichloroethane, and chloroform. The solution can be applied to a substrate by spin coating, spraying, dipping, and like methods. The optical recording layer may also be formed by dry coating methods, such as vacuum evaporation and sputtering of the optical recording material.

The thickness of the optical recording layer is usually 0.001 to 10 μm, preferably 0.01 to 5 μm.

The content of the cyanine compound (I) in the optical recording layer is preferably 50 to 100% by weight. The optical recording material preferably contains 50 to 100% by weight of the cyanine compound (I) on a solid basis to give the above-recited cyanine compound (I) content in the optical recording layer.

If desired, the optical recording layer can contain compounds commonly employed in an optical recording layer, such as cyanine compounds other than those of formula (I), azo compounds, phthalocyanine compounds, and porphyrin compounds. The optical recording layer can further contain resins, such as polyethylene, polyester, polystyrene, and polycarbonate, surface active agents, antistatic agents, lubricants, flame retardants, radical scavengers (e.g., hindered amines), pit formation accelerators (e.g., ferrocene derivatives), dispersants, antioxidants, crosslinking agents, light resistance imparting agents, and so forth. The optical recording layer can furthermore contain an aromatic nitroso compound, an aluminum compound, an iminium compound, a bisiminium compound, a transition metal chelate compound, and the like as a quencher for singlet oxygen, etc. These various components other than cyanine compound (I) can be present in the optical recording layer in a total amount of up to 50% by weight. Accordingly, the total content of these components in the optical recording material is preferably up to 50% by weight on a solid basis.

The substrate on which the optical recording layer is provided is not particularly limited as long as it is substantially transparent to writing (recording) light and reading (reproducing) light and includes resins, such as polymethyl methacrylate, polyethylene terephthalate, and polycarbonate, and glass. The substrate can have an arbitrary form, including a tape, a drum, a belt, and a disk.

A reflective layer of gold, silver, aluminum, copper, etc. may be formed on the optical recording layer by vacuum evaporation or sputtering. A protective layer of an acrylic resin, an ultraviolet cured resin, etc. may be provided on the optical recording layer.

The optical recording material of the present invention is suitable for optical recording media using a semiconductor laser for writing and reading, especially high-speed recording type optical disks such as DVD-Rs.

The present invention will now be illustrated in greater detail with reference to Preparation Examples, Evaluation Example, Examples, and Comparative Examples, but it should be understood that the invention is not construed as being limited thereto.

PREPARATION EXAMPLE 1

Synthesis of Tetrafluoroborate of Compound No. 3:

a) Preparation of Indole Derivative

In a reaction flask were put 24.4 g of N-methyl-N-phenylhydrazine, 58.8 g of 4-(2-fluoro-4-bromophenyl)butan-2-one, and 100 g of ethanol and stirred at 70° C. for 1 hour. To the reaction mixture was added dropwise 25 g of a 35 wt % hydrochloric acid aqueous solution at 70° C., followed by allowing the mixture to react at 80° C. for 1 hour. After cooling to room temperature, 100 g of toluene was added, and the mixture was washed with three 150 g portions of water and dried over anhydrous sodium sulfate. The resulting solution was freed of the solvent, and the residue was recrystallized from 70 g of ethanol. The crystals were washed with ethanol and dried in vacuo at 80° C. for 2 hours to give. 40.0 g (yield: 60.2%) of an indole derivative having a substituted benzyl group as white crystals.

b) Synthesis of Intermediate Compound

In an autoclave were put 33.2 g of the indole derivative prepared in (a) above, 17.0 g of methyl iodide, and 71 g of methanol and allowed to react at 100° C. for 4 hours. The reaction system was freed of the solvent, and the residue was dissolved in 4.7 g of ethanol while hot. To the solution was added 47 g of butyl acetate for crystallization. The crystals were collected by filtration and dried in vacuo at 80° C. for 2 hours to afford 15 g of an intermediate compound in a yield of 31.6% as yellow crystals.

c) Synthesis of Cyanine Compound

Into a reaction flask were charged 1.96 g of the intermediate compound prepared in (b) above, 2.08 g of intermediate compound A shown below, 1.40 g of acetic anhydride, and 7.25 g of pyridine, and the mixture was allowed to react at 60° C. for 4 hours. To the reaction mixture were added 15 g of chloroform and a solution of 1.51 g of sodium tetrafluoroborate in 15 g of water, followed by stirring at room temperature for 30 minutes. The aqueous phase was removed. A solution of 1.5 g of sodium tetrafluoroborate in 15 g of water was added to the oily phase, the mixture stirred at room temperature for 30 minutes, and the aqueous phase removed. A solution of 0.75 g of sodium tetrafluoroborate in 15 g of water was added to the organic phase, followed by stirring at room temperature for 30 minutes. The aqueous phase was removed. The resulting organic phase was washed with three 15 g portions of water, dried over anhydrous sodium sulfate, and freed of the solvent to give an oily product. The oily product was heated, and 21.6 g of isopropyl alcohol was added thereto dropwise while refluxing. After the reaction system was cooled to 25° C., the supernatant liquid was removed by decantation. The residue was dissolved in 10 g of ethanol at 50° C., followed by cooling to 25° C. The thus precipitated crystals were collected by filtration, washed with ethanol, and vacuum dried at 120° C. for 2 hours to furnish 0.9 g (yield: 29.4%) of purple crystals.

The product as obtained was analyzed to give the following results and identified to be a tetrafluoroborate of compound No. 3.

Intermediate compound A:

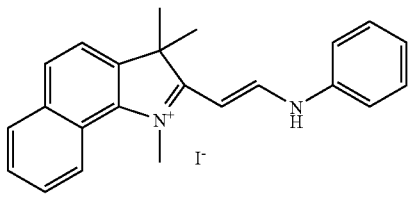

Results of Analyses:
Optical characteristics ($3.207 \times 10^{-6}$ mol/l in chloroform):
  $\lambda_{max}$: 590 nm; $\epsilon$: $1.04 \times 10^5$
Melting point (endothermic peak temperature in DSC in nitrogen; rate of temperature rise: 10° C./min): 214° C.
Molecular weight (TOF-mass spectrometry): 667.4
$^1$H-NMR (solvent: DMSO): shown in FIGS. 1-*a*, 1-*b*, and 1-*c*

PREPARATION EXAMPLE 2

Synthesis of Perchlorate of Compound No. 20:

a) Preparation of Indole Derivative

In a reaction flask were put 34.4 g of N-methyl-N-naphthylhydrazine, 42.5 g of 4-(4-cyanophenyl)butan-2-one, and 93 g of ethanol, followed by stirring at 70° C. for 1 hour. To the reaction mixture was added dropwise 25 g of a 35 wt % hydrochloric acid aqueous solution at 70° C., and the mixture was allowed to react at 80° C. for 1 hour. After cooling the reaction mixture to room temperature, 100 g of toluene was added thereto. The mixture was washed with three 150 g portions of water and dried over anhydrous sodium sulfate. The solvent was removed, and the residue was recrystallized from 70 g of ethanol. The crystals were washed with ethanol and dried in vacuo at 80° C. for 2 hours to give 35.0 g (yield: 56.4%) of an indole derivative having a substituted benzyl group as white crystals.

b) Preparation of Intermediate Compound

In an autoclave were put 31.0 g of the indole derivative obtained in (a) above, 17.0 g of methyl iodide, and 68 g of methanol and allowed to react at 100° C. for 5 hours. The reaction system was freed of the solvent, and the residue was dissolved in 4.5 g of ethanol while hot. To the solution was added 45 g of butyl acetate for crystallization. The crystals were collected by filtration and dried in vacuo at 80° C. for 2 hours to afford 7.0 g (15.5%) of an intermediate compound as yellow crystals.

c) Synthesis of Cyanine Compound

Into a reaction flask were charged 3.20 g of the intermediate compound prepared in (b) above, 3.62 g of intermediate compound B, 2.42 g of acetic anhydride, and 12.48 g of pyridine and allowed to react at 52° C. for 4 hours. To the reaction mixture were added 30 g of chloroform and a solution of 1.66 g of sodium perchlorate monohydrate in 30 g of water, followed by stirring at room temperature for 30 minutes. The aqueous phase was removed. A solution of 1.66 g of sodium perchlorate monohydrate in 30 g of water was added to the oily phase, the mixture stirred at room temperature for 30 minutes, and the aqueous phase removed. A solution of 0.8 g of sodium perchlorate monohydrate in 30 g of water was added to the organic phase, followed by stirring at room temperature for 30 minutes. The aqueous phase was removed. The resulting organic phase was washed with three 30 g portions of water, dried over anhydrous sodium sulfate, and freed of the solvent to give an oily product. The oily product was heated, and 45 g of ethanol was added thereto dropwise while refluxing. The reaction system was cooled to 25° C., and the crude crystals thus precipitated were collected by filtration. The crude crystals were recrystallized from a 1:1 (by weight) mixed solvent of pyridine and methanol. The resulting crystals were washed with methanol and vacuum dried at 120° C. for 2 hours to furnish 2.3 g (yield: 42.2%) of brown crystals.

The product as obtained was analyzed to give the following results and identified to be a perchlorate of compound No. 20.

Intermediate Compound B:

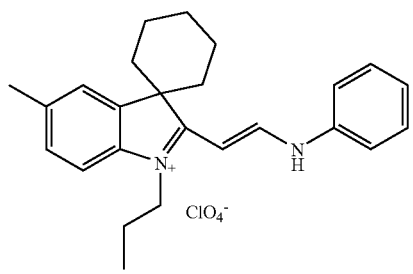

Results of Analyses:
Optical characteristics ($5.911 \times 10^{-6}$ mol/l in chloroform):
  $\lambda_{max}$: 590 nm; $\epsilon$: $1.30 \times 10^5$
Melting point (endothermic peak temperature in DSC in nitrogen; rate of temperature rise: 10° C./min): 231° C.
Molecular weight (TOF-mass spectrometry): 690.3
$^1$H-NMR (solvent: DMSO): shown in FIGS. 2-*a*, 2-*b*, and 2-*c*

PREPARATION EXAMPLE 3 a) Preparation of Indole Derivative

In a reaction flask were put 34.4 g of N-methyl-N-naphthylhydrazine, 38.9 g of 4-(2-methylphenyl)butan-2-one, and 90 g of ethanol and stirred at 70° C. for 1 hour. To the reaction mixture was added dropwise 25 g of a 35 wt % hydrochloric acid aqueous solution at 70° C., followed by allowing the mixture to react at 80° C. for 1 hour. After cooling to room temperature, 100 g of toluene was added, and the mixture was washed with three 150 g portions of water and dried over anhydrous sodium sulfate. The resulting solution was freed of the solvent, and the residue was recrystallized from 70 g of ethanol. The crystals were washed with ethanol and dried in vacuo at 80° C. for 2 hours to give 38.1 g (yield: 63.5%) of an indole derivative having a substituted benzyl group as white crystals.

b) Preparation of Intermediate Compound

In an autoclave were put 29.9 g of the indole derivative prepared in (a) above, 17.0 g of methyl iodide, and 66.2 g of methanol and allowed to react at 100° C. for 7 hours. The reaction system was freed of the solvent, and the residue was dissolved in 4.4 g of ethanol while hot. To the solution was added 44 g of butyl acetate for crystallization. The crystals were collected by filtration and vacuum dried at 80° C. for 2 hours to give 6.5 g (yield: 14.7%) of an intermediate compound as yellow crystals.

c) Synthesis of Cyanine Compound

Into a reaction flask were charged 6.10 g of the intermediate compound prepared in (b) above, 1.52 g of N,N'-diphenylamidine, 2.37 g of acetic anhydride, and 12.24 g of pyridine, and the mixture was allowed to react at 60° C. for 6 hours. To the reaction mixture were added 25 g of chloroform and a solution of 4.27 g of potassium hexafluorophosphate in 43 g of water, followed by stirring at room temperature for 30 minutes. The aqueous phase was removed. A solution of 2.10 g of potassium hexafluorophosphate in 25 g of water was added to the organic phase, followed by stirring at room temperature for 30 minutes. The aqueous phase was removed. A solution of 1.0 g of potassium hexafluorophosphate in 25 g of water was additionally added, followed by stirring at room temperature for 30 minutes. The aqueous phase was removed. The resulting organic phase was washed with three 30 g portions of water, dried over anhydrous sodium sulfate, and freed of the solvent to give an oily product. The oily product was heated, and 32 g of methanol was added thereto dropwise while refluxing. The reaction system was cooled to 25° C., and the precipitated crystals were collected by filtration, washed with methanol and dried in vacuo at 120° C. for 2 hours to furnish 1.4 g (yield: 23.1%) of green crystals.

The product as obtained was analyzed to give the following results and identified to be a hexafluorophosphate of compound No. 43.

Results of Analyses:
Optical characteristics ($3.628 \times 10^{-6}$ mol/l in chloroform):
$\lambda_{max}$: 608 nm; $\epsilon$: $1.089 \times 10^5$
Melting point (endothermic peak temperature in DSC in nitrogen; rate of temperature rise: 10° C./min): 188° C.
Molecular weight (TOF-mass spectrometry): 782.8
$^1$H-NMR (solvent: DMSO): shown in FIGS. 3-*a*, 3-*b*, and 3-*c*

PREPARATION EXAMPLE 4

Synthesis of Hexafluorophosphate of Compound No. 57:

a) Preparation of Intermediate Compound

In a reaction flask were put 6.27 g of 3-benzyl-2-methyl-1-propylnaphthylindole, 4.14 g of 2,4-difluorobenzyl bromide, and 20.8 g of ethanol and allowed to react under reflux for 2 hours. To the reaction mixture was added 41.6 g of ethyl acetate, and the precipitated crystals were collected by filtration to yield 3.46 g (33.2%) of an intermediate compound.

b) Synthesis of Cyanine Compound:

Into a reaction flask were put 1.56 g of the intermediate compound prepared in (a) above, 1.35 g of intermediate compound C shown below, 0.92 g of acetic anhydride, and 4.75 g of pyridine, and the mixture was allowed to react at 70° C. for 4 hours. To the reaction mixture were added 30 g of chloroform and a solution of 1.66 g of potassium hexafluorophosphate in 40 g of water, followed by stirring at room temperature for 30 minutes. The aqueous phase was removed. A solution of 0.8 g of potassium hexafluorophosphate in 30 g of water was added to the resulting organic phase, followed by stirring at room temperature for 30 minutes. The aqueous phase was removed. A solution of 0.8 g of potassium hexafluorophosphate in 30 g of water was further added to the organic phase, the mixture stirred at room temperature for 30 minutes, and the aqueous phase removed. The resulting organic phase was washed with three 30 g portions of water, dried over anhydrous sodium sulfate, and freed of the solvent to give crude crystals, which were recrystallized from ethanol. The crystals were washed with ethanol and vacuum dried at 120° C. for 2 hours to afford 1.03 g (yield: 43.1%) of green crystals.

The product as obtained was analyzed to give the following results and identified to be a hexafluorophosphate of compound No. 57.

Intermediate Compound C:

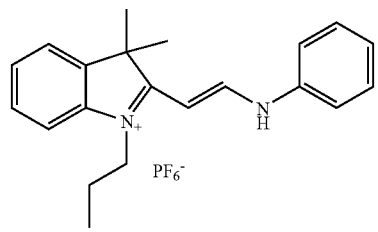

Results of Analyses:
Optical characteristics ($3.214 \times 10^{-6}$ mol/l in chloroform):
$\lambda_{max}$: 587 nm; $\epsilon$: $1.29 \times 10^5$
Melting point (endothermic peak temperature in DSC in nitrogen; rate of temperature rise: 10° C./min): 222° C.
Molecular weight (TOF-mass spectrometry): 797.8
$^1$H-NMR (solvent: DMSO): shown in FIGS. 4-*a* and 4-*b*

EVALUATION EXAMPLE

The compounds obtained in Preparation Examples 1 to 4 and comparative compounds 1 to 3 shown below were subjected to differential thermal analysis (DTA) to determine the thermal decomposition temperature (the exothermic peak temperature) in temperature rise at 10° C./min in nitrogen. The results obtained are shown in Table 1 below.

Comparative Compound 1

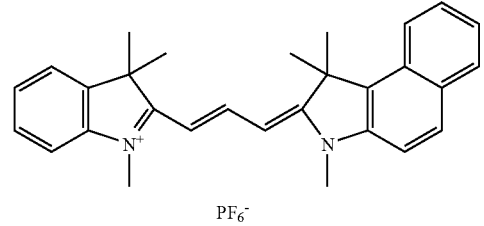

Comparative Compound 2

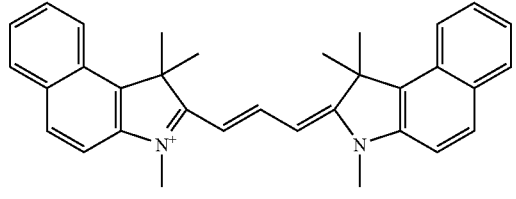

Comparative Compound 3

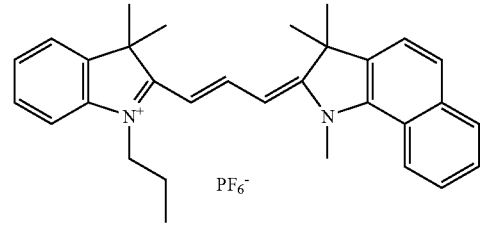

TABLE 1

| | Cyanine compound | | Thermal Decomposition |
|---|---|---|---|
| | Cation Moiety | Anion Moiety | Temperature (° C.) |
| Prepn. Ex. 1 | Compound No. 3 | $BF_4^-$ | 230.7 |
| Prepn. Ex. 2 | Compound No. 20 | $ClO_4^-$ | 233.2 |
| Prepn. Ex. 3 | Compound No. 43 | $PF_6^-$ | 188.5 |

TABLE 1-continued

| | Cyanine compound | | Thermal Decomposition |
|---|---|---|---|
| | Cation Moiety | Anion Moiety | Temperature (° C.) |
| Prepn. Ex. 4 | Compound No. 57 | $PF_6^-$ | 233.1 |
| — | Comp. Compound 1 (Anion Moiety: $PF_6^-$) | | 282.5 |
| — | Comp. Compound 2 (Anion Moiety: $PF_6^-$) | | 292.0 |
| — | Comp. Compound 3 (Anion Moiety: $PF_6^-$) | | 254.4 |

It was confirmed by the results in Table 1 that the cyanine compounds according to the present invention have lower thermal decomposition temperatures than the relevant comparative cyanine compounds. This proves that the cyanine compounds (I) are suitable as optical recording materials fit for high-speed recording.

EXAMPLES 1 TO 4

Preparation and Evaluation of Optical Recording Media:

A titanium chelate compound T-50 (available from Nippon Soda Co., Ltd.) was applied to a polycarbonate disk substrate having a diameter of 12 cm, followed by hydrolysis to form an undercoating layer having a thickness of 0.01 μm. A 2 wt % solution of each of the cyanine compounds obtained in Preparation Examples 1 to 4 in 2,2,3,3-tetrafluoropropanol was applied onto the undercoating layer by spin coating to form an optical recording layer having a thickness of 100 nm. The transmitted UV spectrum and the reflected UV spectrum (incidence angle: 5°) of the thus prepared optical recording disks were measured. The results obtained are shown in Table 2 below.

A transmitted light spectrum is related to writing performance of an optical recording medium. The absorption intensity at $\lambda_{max}$ of a given optical recording medium being taken as 1, the absorption intensity at a writing wavelength is properly in the range between 0.15 and 0.50. If the relative intensity is smaller than 0.15, the medium has poor writing performance. If it exceeds 0.50, the optical recording layer exhibits low light resistance and poor archival stability. A reflected light spectrum is related to reading performance of an optical recording medium. In a read mode, a read laser beam is reflected on a medium, and the record is detected as a difference in reflected light quantity at the laser wavelength. Accordingly, a compound having a maximum reflection wavelength nearer to the read laser beam wavelength is more desirable as an optical recording material.

TABLE 2

| Exam. No. | Cyanine Compound | Transmitted Light $\lambda_{max}$ (nm) | Transmitted Light (Relative Intensity) | Reflected Light $\lambda_{max}$ (nm) |
|---|---|---|---|---|
| 1 | Compound No. 3 $BF_4^-$ salt (Prepn. Ex. 1) | 607.5 | 635 nm (0.449) 650 nm (0.213) 660 nm (0.155) | 638 |
| 2 | Compound No. 20 $ClO_4^-$ salt (Prepn. Ex. 2) | 604 | 635 nm (0.303) 650 nm (0.156) | 634 |
| 3 | Compound No. 43 $PF_6^-$ salt (Prepn. Ex. 3) | 619 | 650 nm (0.384) 660 nm (0.228) | 651 |
| 4 | Compound No. 57 $PF_6^-$ salt (Prepn. Ex. 4) | 601 | 635 nm (0.204) | 626 |

The results in Table 2 reveal that the optical recording medium having an optical recording layer formed of the cyanine compound of the present invention is suited to writing/reading systems using a laser beam having a wavelength of 635 nm, 650 nm or 660 nm, the standards of DVD-Rs.

What is claimed is:

1. An optical recording medium comprising a substrate and an optical recording layer, the optical recording layer being a thin film formed of the optical recording material containing a cyanine compound represented by formula (I):

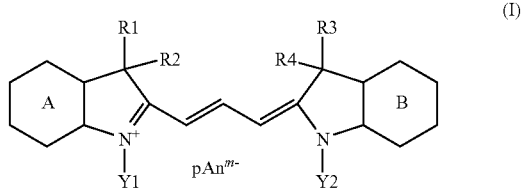

wherein ring A and ring B each represent a substituted or unsubstituted benzene ring or a substituted or unsubstituted naphthalene ring; $R^1$, $R^2$, $R^3$, and $R^4$ each represent an alkyl group having 1 to 4 carbon atoms or a substituted or unsubstituted benzyl group, or $R^1$ and $R^2$ are taken together, or $R^3$ and $R^4$ are taken together, to form a 3- to 6-membered ring, provided that at least one of $R^1$, $R^2$, $R^3$, and $R^4$ is a substituted benzyl group to (i) provide a lower thermal decomposition temperature than if at least one of $R^1$, $R^2$, $R^3$, and $R^4$ is not a substituted benzyl group and (ii) a thermal decomposition of the cyanine compound is less than 233.2° C.; $Y^1$ and $Y^2$ each represent an organic group having 1 to 30 carbon atoms; $An^{m-}$ represents an m-valent anion; m represents an integer 1 or 2; p represents a coefficient for maintaining overall charge neutrality.

2. The optical recording material according to claim 1, wherein the substituted benzyl group represented by at least one of $R^1$, $R^2$, $R^3$, and $R^4$ is represented by formula (II)

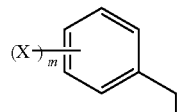
(II)

wherein m represents an integer 1 or 2; X represents a hydroxyl group, a halogen group, a cyano group, a nitro group, an alkyl group having 1 to 4 carbon atoms, a halogen-substituted alkyl group having 1 to 4 carbon atoms, an alkoxy group having 1 to 4 carbon atoms or a halogen-substituted alkoxy group having 1 to 4 carbon atoms; when m is 2, the two X's may be the same or different.

3. The optical recording material according to claim 1, wherein the ring A and/or the ring B in formula (I) constituting the heterocyclic ring to which the substituted benzyl group is bonded is/are a substituted or unsubstituted naphthalene ring.

4. An optical recording medium comprising a substrate and an optical recording layer, the optical recording layer being a thin film formed of the optical recording material containing a cyanine compound represented by one of

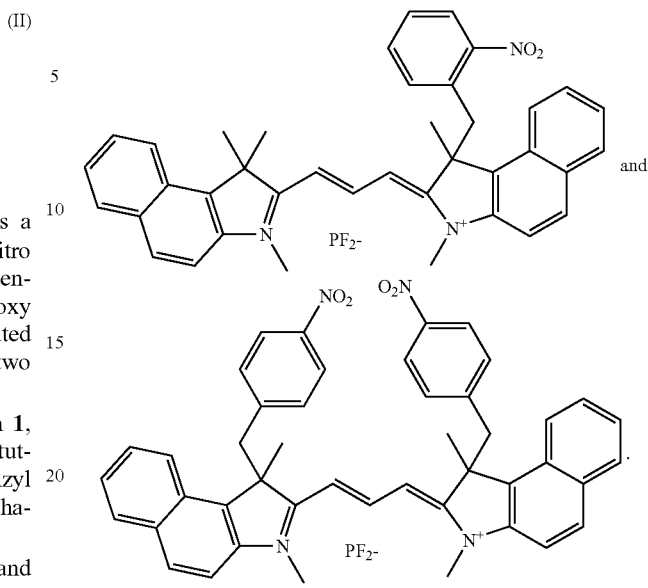

* * * * *